US012025893B2

(12) United States Patent
Yoshino et al.

(10) Patent No.: US 12,025,893 B2
(45) Date of Patent: Jul. 2, 2024

(54) DISPLAY DEVICE

(71) Applicant: Sharp Display Technology Corporation, Kameyama (JP)

(72) Inventors: Hikaru Yoshino, Kameyama (JP); Junichi Morinaga, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/117,095

(22) Filed: Mar. 3, 2023

(65) Prior Publication Data

US 2023/0288766 A1 Sep. 14, 2023

(30) Foreign Application Priority Data

Mar. 10, 2022 (JP) ................. 2022-036988

(51) Int. Cl.
| | |
|---|---|
| *G02F 1/1362* | (2006.01) |
| *G02F 1/1333* | (2006.01) |
| *G02F 1/1335* | (2006.01) |
| *G02F 1/1339* | (2006.01) |
| *G02F 1/1368* | (2006.01) |

(52) U.S. Cl.
CPC .. *G02F 1/136286* (2013.01); *G02F 1/133345* (2013.01); *G02F 1/133514* (2013.01); *G02F 1/13392* (2013.01); *G02F 1/136222* (2021.01); *G02F 1/1368* (2013.01)

(58) Field of Classification Search
None
See application file for complete search history.

(56) References Cited

U.S. PATENT DOCUMENTS

2019/0278144 A1 9/2019 Hosokawa et al.
2020/0333675 A1* 10/2020 Morimoto ......... G02F 1/136227

FOREIGN PATENT DOCUMENTS

JP 2019159028 A 9/2019

\* cited by examiner

*Primary Examiner* — Dung T Nguyen
(74) *Attorney, Agent, or Firm* — ScienBiziP, P.C.

(57) ABSTRACT

A display device includes an array substrate, a counter substrate, a first pixel electrode, a second pixel electrode spaced apart from the first pixel electrode in a first direction, a third pixel electrode spaced apart from the second pixel electrode in the first direction, a first wiring line positioned between the first pixel electrode and the second pixel electrode and extending in a second direction intersecting the first direction, a second pixel electrode row including the second pixel electrode and composed of a plurality of pixel electrodes aligned in the second direction, a third pixel electrode row including the third pixel electrode and composed of a plurality of pixel electrodes aligned in the second direction, a first insulating film disposed on a lower-layer side of the first wiring line, and a spacer protruding from the counter substrate toward the array substrate.

6 Claims, 22 Drawing Sheets

DISPLAY DEVICE

CROSS-REFERENCE TO RELATED APPLICATIONS

This application claims the benefit of priority to Japanese Patent Application Number 2022-036988 filed on Mar. 10, 2022. The entire contents of the above-identified application are hereby incorporated by reference.

BACKGROUND

Technical Field

The technique disclosed in the present specification relates to a display device.

In the related art, as an example of a display device in the related art, there is known a display device described in JP 2019-159028 A. The display device described in JP 2019-159028 A includes a first common electrode, a second common electrode separated from the first common electrode in a first direction, and a metal wiring line overlapping the first common electrode and the second common electrode and extending in the first direction. The metal wiring line is also positioned between the first common electrode and the second common electrode, and includes an end portion overlapping one of the first common electrode and the second common electrode.

SUMMARY

In the display device described in JP 2019-159028 A described above, a spacer forming a cell gap between the first substrate and the second substrate overlaps the metal wiring line between the first common electrode and the second common electrode. Here, as long as a line width of the metal wiring line is sufficiently large with respect to a diameter of the spacer, a contact area with an inner face of the first substrate can be sufficiently ensured. However, in a case in which the line width of the metal wiring line cannot be sufficiently ensured due to high definition or the like, a portion of the inner face of the first substrate that overlaps the spacer but does not overlap the metal wiring line cannot come into contact with the spacer. Therefore, there is a possibility that the contact area of the spacer with the inner face of the first substrate cannot be sufficiently ensured. When the contact area described above is insufficient, a uniformity pertaining to the cell gap may be impaired.

The techniques described in the present specification have been made based on the circumstances described above, and an object thereof is to improve a uniformity pertaining to a cell gap.

(1) A display device according to a technique described in this specification includes an array substrate, a counter substrate facing the array substrate with a gap therebetween, a first pixel electrode provided to the array substrate, a second pixel electrode provided to the array substrate and spaced apart from the first pixel electrode in a first direction, a third pixel electrode provided to the array substrate and spaced apart from the second pixel electrode in the first direction, a first wiring line provided to the array substrate, positioned between the first pixel electrode and the second pixel electrode, and extending in a second direction intersecting the first direction, a second pixel electrode row provided to the array substrate, including the second pixel electrode, and composed of a plurality of pixel electrodes aligned in the second direction, a third pixel electrode row provided to the array substrate, including the third pixel electrode, and composed of a plurality of pixel electrodes aligned in the second direction, a first insulating film provided to the array substrate and disposed on a lower-layer side of the first wiring line, and a spacer provided to the counter substrate and protruding from the counter substrate toward the array substrate. The spacer is positioned between the second pixel electrode row and the third pixel electrode row, and a portion of the first insulating film overlapping the spacer is a higher portion higher than a remaining portion.

(2) Further, in the display device described above, in addition to (1) above, the spacer may be positioned between the second pixel electrode and the third pixel electrode.

(3) Further, in the display device described above, in addition (1) or (2) above, the array substrate or the counter substrate may be provided with a first color filter overlapping the first pixel electrode, a second color filter overlapping the second pixel electrode, and a third color filter overlapping the third pixel electrode, and the first color filter may be highest in relative luminous efficiency, the second color filter may be lowest in the relative luminous efficiency, and the third color filter may be lower in the relative luminous efficiency than the first color filter and higher in the relative luminous efficiency than the second color filter.

(4) Further, in the display device described above, in addition to (3) above, the array substrate may be provided with a fourth pixel electrode spaced apart from the third pixel electrode on a side opposite to the second pixel electrode in the first direction, the first color filter may overlap the first pixel electrode and the fourth pixel electrode, and the array substrate may be provided with a second wiring line positioned between the third pixel electrode and the fourth pixel electrode and extending in the second direction.

(5) Further, in the display device described above, in addition to any one of (1) to (4) above, the array substrate may be provided with a second insulating film disposed on an upper-layer side of the first wiring line, and a position detection electrodes disposed on an upper-layer side of the second insulating film, and the first wiring line may include a first position detection wiring line connected to any one of a plurality of the position detection electrodes.

(6) Further, in the display device described above, in addition to (5) above, the array substrate may be provided with a third wiring line disposed on a lower-layer side of the first insulating film, and a blocking portion disposed in the same layer as the first wiring line. A plurality of the first pixel electrodes, a plurality of the second pixel electrodes, and a plurality of the third pixel electrodes may be disposed side by side spaced apart in the second direction. The plurality of the position detection electrodes may be disposed side by side spaced apart in the second direction, and a boundary between two of the position detection electrodes adjacent to each other in the second direction may be aligned with boundaries between two of the first pixel electrodes, two of the second pixel electrodes, and two of the third pixel electrodes respectively adjacent to each other in the second direction. The third wiring line may extend in the first direction and may be positioned between two of the position detection electrodes adjacent to each other in the second direction. The blocking portion may overlap at least a portion of the third wiring line and may be directly or indirectly connected to any one of the plurality of the position detection electrodes.

(7) Further, in the display device described above, in addition to (6) above, the spacer may include a main spacer, and a plurality of sub-spacers each having a protrusion dimension from the counter substrate smaller a protrusion dimension of the main spacer. The main spacer may overlap any one of the plurality of the position detection electrodes. The plurality of sub-spacers may include a first sub-spacer overlapping any one of the plurality of the position detection electrodes, and a second sub-spacer at least partially positioned between two of the position detection electrodes adjacent to each other in the second direction, and overlapping a portion of the blocking portion.

(8) Further, in the display device described above, in addition to (6) above, the spacer may include a main spacer, and a sub-spacer having a protrusion dimension from the counter substrate smaller than a protrusion dimension of the main spacer. The main spacer and the sub-spacer may each overlap any one of the plurality of the position detection electrodes and not overlap the blocking portion.

(9) Further, in the display device described above, in addition to any one of (6) to (8) above, the array substrate may be provided with a fourth pixel electrode disposed spaced apart from the third pixel electrode on a side opposite to the second pixel electrode in the first direction, and a second position detection wiring line positioned between the third pixel electrode and the fourth pixel electrode and extending in the second direction. The array substrate or the counter substrate may be provided with a first color filter overlapping the first pixel electrode and the fourth pixel electrode, a second color filter overlapping the second pixel electrode, and a third color filter overlapping the third pixel electrode. The first color filter may be highest in relative luminous efficiency, the second color filter may be lowest in the relative luminous efficiency, and the third color filter may be lower in the relative luminous efficiency than the first color filter and higher in the relative luminous efficiency than the second color filter. The blocking portion may include a first blocking portion coupled to the first position detection wiring line, a second blocking portion coupled to the second position detection wiring line, and a third blocking portion separated from the first position detection wiring line, the second position detection wiring line, the first blocking portion, and the second blocking portion. The third blocking portion may be disposed between the first blocking portion and the second blocking portion in the first direction.

(10) Further, in the display device described above, in addition to any one of (6) to (8) above, the array substrate may be provided with a plurality of fourth pixel electrodes spaced apart from the plurality of the third pixel electrodes on a side opposite to the second pixel electrode in the first direction, and a second position detection wiring line positioned between the third pixel electrode and the fourth pixel electrode and extending in the second direction. The array substrate or the counter substrate may be provided with a plurality of first color filters overlapping the first pixel electrode and the fourth pixel electrode, a plurality of second color filters overlapping the second pixel electrode, and a plurality of third color filters overlapping the third pixel electrode. The first color filter may be highest in relative luminous efficiency, the second color filter may be lowest in the relative luminous efficiency, the third color filter may be lower in the relative luminous efficiency than the first color filter and higher in the relative luminous efficiency than the second color filter. The blocking portion may include a fourth blocking portion coupled to the first position detection wiring line, and a fifth blocking portion coupled to the second position detection wiring line. The fourth blocking portion and the fifth blocking portion may be disposed with the higher portion interposed therebetween.

(11) Further, in the display device described above, in addition to (10) above, the plurality of the position detection electrodes may include a first position detection electrode, a second position detection electrode spaced apart from the first position detection electrode in the second direction, and a third position detection electrode spaced apart from the second position detection electrode in the second direction. The fourth blocking portion and the fifth blocking portion may be positioned between the first position detection electrode and the second position detection electrode and between the second position detection electrode and the third position detection electrode, respectively. The blocking portion may include a sixth blocking portion coupled to the second position detection wiring line, and a seventh blocking portion coupled to the first position detection wiring line. The sixth blocking portion may be disposed on a side opposite to the fifth blocking portion in the first direction with the second position detection wiring line interposed therebetween, and the seventh blocking portion may be disposed on a side opposite to the fourth blocking portion in the first direction with the first position detection wiring line interposed therebetween.

(12) Further, in the display device described above, in addition to any one of (5) to (11) above, a plurality of the first pixel electrodes, a plurality of the second pixel electrodes, a plurality of the third pixel electrodes, a plurality of the first wiring lines, a plurality of the spacers, and a plurality of the higher portions may be provided. The plurality of the first wiring lines may include a first connection wiring line connected to any one of the plurality of the position detection electrodes at a plurality of locations. The first connection wiring line may be disposed side by side and spaced apart in the second direction with respect to the first position detection wiring line.

(13) Further, in the display device described above, in addition to any one of (1) to (12) above, a plurality of the first pixel electrodes, a plurality of the second pixel electrodes, and a plurality of the third pixel electrodes may be disposed side by side spaced apart in the second direction, and a plurality of the spacers and a plurality of the higher portions may be disposed side by side spaced apart in the second direction.

(14) Further, in the display device described above, in addition to (13) above, the array substrate may be provided with a dummy wiring line positioned between the second pixel electrode and the third pixel electrode, positioned between two of the plurality of the higher portions adjacent to each other in the second direction, disposed in the same layer as the first wiring line, and extending in the second direction.

(15) Further, in the display device described above, in addition to (14) above, the array substrate may be provided with a second insulating film disposed on an upper-layer side of the first wiring line, and a position detection electrode disposed on an upper-layer side of the second insulating film. The first wiring line may include a first position detection wiring line connected to any one of the plurality of the position detection electrodes, and the dummy wiring line may be connected to any one of the plurality of the position detection electrodes.

According to the techniques described in this specification, a uniformity relating to a cell gap can be improved.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIG. 1 to FIG. 14. In the present embodiment, an example of a liquid crystal panel (display device) 10 having an image display function and a touch panel function (position input function, position detection function) will be described. Note that an X axis, a Y axis, and a Z axis are illustrated in part of each drawing, and each axial direction is illustrated to represent a direction in each drawing. Moreover, an upper side and a lower side in FIG. 5, FIG. 6, FIG. 10, FIG. 13, and FIG. 14 are defined as a front side and a rear side, respectively.

Figure 1:
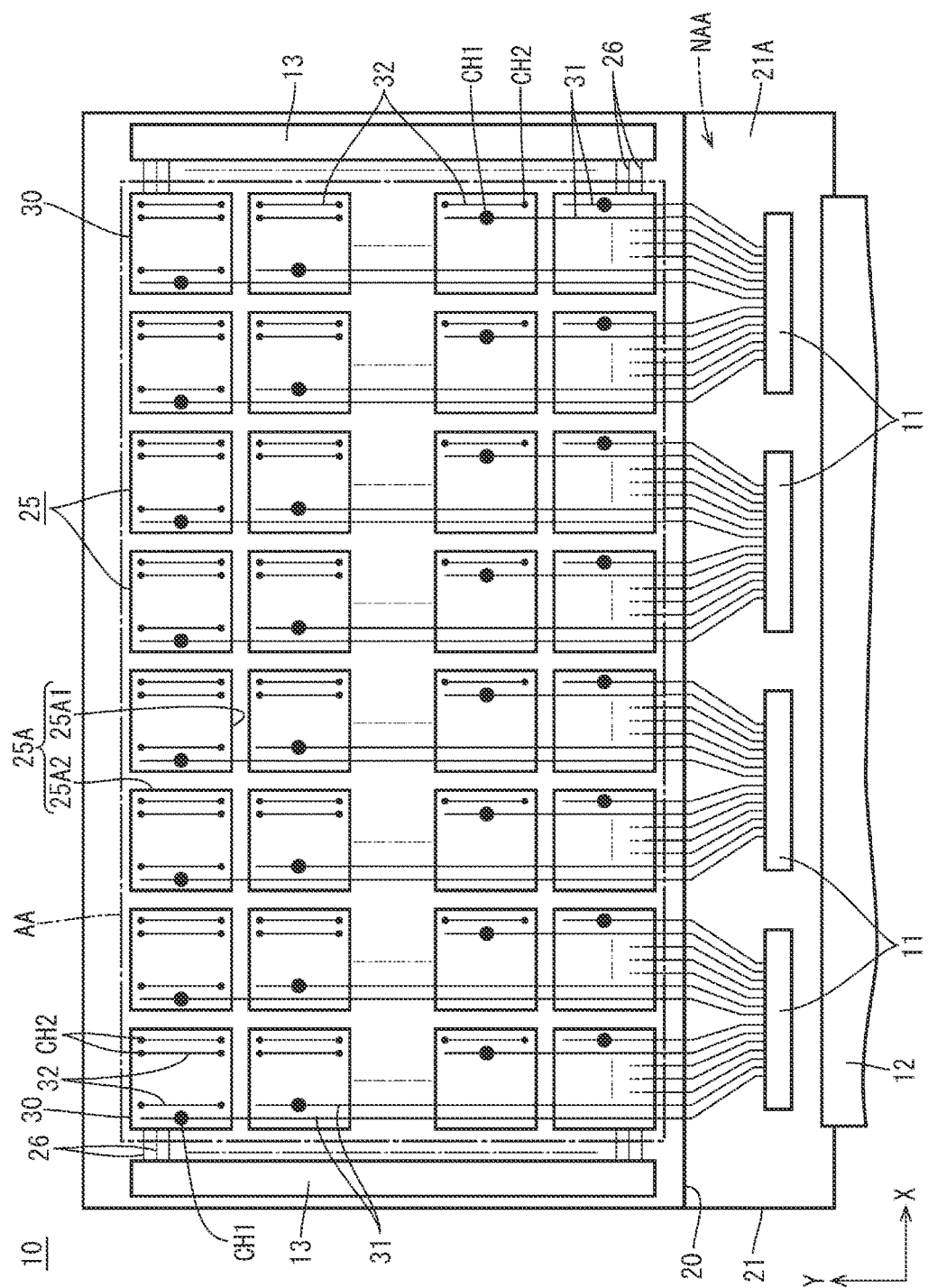
FIG. 1 is a plan view of a liquid crystal panel according to a first embodiment.

A schematic planar configuration of the liquid crystal panel 10 will now be described with reference to FIG. 1. As illustrated in FIG. 1, the liquid crystal panel 10 has a horizontally elongated, substantially rectangular shape as a whole in plan view. A short side direction, a long side direction, and a plate thickness direction (normal direction of a plate surface of each substrate 20, 21) of this liquid crystal panel 10 coincide with a Y-axis direction, an X-axis direction, and a Z-axis direction, respectively. In the present embodiment, the X-axis direction is a "first direction" and the Y-axis direction is a "second direction." The liquid crystal panel 10 can display an image by using illumination light emitted from a backlight device (illumination device) provided on the rear side thereof. The backlight device is disposed on a rear side (back face side) of the liquid crystal panel 10, and includes a light source (for example, a light emitting diode (LED)), an optical member configured to impart an optical effect on light from the light source, thereby converting the light into planar light, and the like, for example.

In the liquid crystal panel 10, as illustrated in FIG. 1, a center portion of a screen is established as a display region (range surrounded by a dot-dash line in FIG. 1) AA in which images are displayed. In contrast, a frame-shaped (frame-formed) outer peripheral portion surrounding the display region AA of the screen of the liquid crystal panel 10 is a non-display region NAA in which images are not displayed. The liquid crystal panel 10 is formed by bonding the pair of substrates 20, 21 together. Of the pair of substrates 20, 21, the substrate on a front side (front face side) is the counter substrate 20, and the substrate on a rear side (back face side) is the array substrate (active matrix substrate) 21. The counter substrate 20 and the array substrate 21 are each formed by layering various films on an inner face side of a glass substrate. Note that polarizers are bonded to outer face sides of both the substrates 20, 21, respectively.

The counter substrate 20, as illustrated in FIG. 1, has a short side dimension that is shorter than a short side dimension of the array substrate 21, and is bonded to the array substrate 21 with one end portion in a short side direction (Y-axis direction) aligned with the array substrate 21. Accordingly, the other end portion in the short side direction of the array substrate 21 is a protruding portion 21A protruding laterally relative to the counter substrate 20 and not overlapping the counter substrate 20. In this protruding portion 21A, a driver (signal supply unit) 11, for supplying various signals for the display function and the touch panel function described below, and a flexible substrate 12 are mounted. The driver 11 is mounted on the protruding portion 21A of the array substrate 21 in a chip-on-glass (COG) manner. The driver 11 is composed of a large-scale integration (LSI) chip including a drive circuit in an interior thereof, and processes various signals transmitted by the flexible substrate 12. Note that the driver 11 can be described as being disposed on one end side of the display region AA of the array substrate 21 in the Y-axis direction. The flexible substrate 12 has a configuration in which a wiring line pattern including a plurality of wiring lines are formed on a substrate made of a synthetic resin material (for example, a polyimide resin) having insulating properties and flexibility.

One end side portion of the flexible substrate 12 is connected to the array substrate 21, and the other end portion thereof is connected to an external control substrate (signal supply source). Various signals supplied from the control substrate are transmitted to the liquid crystal panel 10 via the flexible substrate 12. Further, in the non-display region NAA of the array substrate 21, a pair of gate circuit portions 13 are provided, sandwiching the display region AA therebetween from both sides in the X-axis direction. The gate circuit portions 13 are each configured to supply a scanning signal to a gate wiring line 26 described below, and monolithically provided to the array substrate 21.

The liquid crystal panel 10 according to the present embodiment has both a display function for displaying an image and a touch panel function for detecting a position (input position) input by a user on the basis of the displayed image. In the liquid crystal panel 10, a touch panel pattern for exhibiting the touch panel function is integrated (in an in-cell form). The touch panel pattern is a so-called projected electrostatic capacitance type, and the detection type thereof is a self-capacitance type. As illustrated in FIG. 1, the touch panel pattern is constituted by a plurality of touch electrodes (position detection electrodes) 30 disposed side-by-side in a matrix shape in the plate surface of the liquid crystal panel 10. The touch electrodes 30 are disposed in the display region AA of the liquid crystal panel 10. Accordingly, the display region AA of the liquid crystal panel 10 substantially matches a touch region (position input region) in which an input position can be detected. Note that the non-display region NAA substantially matches a non-touch region (non-position input region) in which an input position cannot be detected. Then, when the user brings a position input member, which is a conductor such as a finger of the user or a touch pen operated by the user, close to the surface (display surface) of the liquid crystal panel 10 on the basis of an image displayed in the display region AA of the liquid crystal panel 10, electrostatic capacitance is formed between the position input member and the touch electrode 30. Thereby, the electrostatic capacitance detected with the touch electrode 30 being close to the position input member changes as the position input member approaches thereto, and is different from the electrostatic capacitance of the touch electrode 30 being far from the position input member. Based on the difference in electrostatic capacitance, a detection circuit described below can detect an input position.

As illustrated in FIG. 1, the plurality of touch electrodes 30 are disposed side by side spaced apart in the X-axis direction (first direction) and the Y-axis direction (second direction) in the display region AA. The touch electrode 30 has a substantially rectangular shape in plan view, with one side having a dimension of several millimeters. The touch electrode 30 is much larger than a pixel PX described below in plan view, and is disposed in a range over a plurality (approximately several tens to several hundreds) of pixels PX in the X-axis direction and the Y-axis direction. A detailed configuration of the touch electrode 30 will be described below.

As illustrated in FIG. 1, a plurality of touch wiring lines (position detection wiring lines) 31 provided in the liquid crystal panel 10 are selectively connected to the plurality of touch electrodes 30. The touch wiring lines 31 extend substantially in the Y-axis direction. One end side portion of the touch wiring line 31 in the Y-axis direction is connected to the driver 11 in the non-display region NAA. The other end side portion of the touch wiring line 31 in the Y-axis direction is connected to a specific touch electrode 30 among the plurality of touch electrodes 30 aligned in the Y-axis direction in the display region AA. The formation range of the touch wiring line 31 in the Y-axis direction is limited to a range from the driver 11 to the touch electrode 30 to be connected thereto, and the touch wiring line 31 is not disposed on a side (upper side in FIG. 1) opposite to the driver 11 side (lower side in FIG. 1) of the touch electrode 30 to be connected thereto. Note that only one touch wiring line 31 may be connected to one touch electrode 30 depending on the number of touch wiring lines 31 installed, but a plurality of touch wiring lines 31 may be connected to one touch electrode 30. In addition, the number of touch wiring lines 31 connected to one touch electrode 30 may vary depending on the position of the touch electrode 30. In this case, for example, preferably the number of touch wiring lines 31 connected to the touch electrode 30 far from the driver 11 is set larger than the number of touch wiring lines 31 connected to the touch electrode 30 close to the driver 11, but is not necessarily limited thereto. Note that, in FIG. 1, a black dot represents the connection location (first contact hole CH1) of the touch wiring line 31 to the touch electrode 30. Furthermore, the touch wiring line 31 is connected to a detection circuit. The detection circuit may be provided in the driver 11, or may be provided outside of the liquid crystal panel 10 and connected via the flexible substrate 12. A detailed configuration of the touch wiring line 31 will be described below.

As illustrated in FIG. 1, a plurality of connection wiring lines 32 provided in the liquid crystal panel 10 are connected to the plurality of touch electrodes 30. The connection wiring lines 32 extend substantially in the Y-axis direction, similarly to the touch wiring lines 31. The connection wiring line 32 overlaps the touch electrode 30 to be connected thereto, and the formation range thereof in the Y-axis direction is limited to the formation range of the touch electrode 30 to be connected thereto. The connection wiring line 32 is connected to the touch electrode 30 to be connected thereto at a plurality of locations. Note that, in FIG. 1, a black dot represents the connection location (second contact hole CH2) of the connection wiring line 32 to the touch electrode 30. A resistance distribution of the touch electrode 30 is reduced by such a connection wiring line 32. The connection wiring lines 32 are spaced apart from the touch wiring lines 31 on the side opposite to the driver 11 side in the Y-axis direction. That is, the connection wiring lines 32 are positioned in the same row as the touch wiring lines 31. The connection wiring lines 32 can be described as being disposed utilizing space where the touch wiring lines 31 are not disposed. A number of the connection wiring lines 32 overlapping the touch electrodes 30 is larger for the touch electrodes 30 farther from the driver 11 than for the touch electrodes 30 closer to the driver 11.

Figure 2:
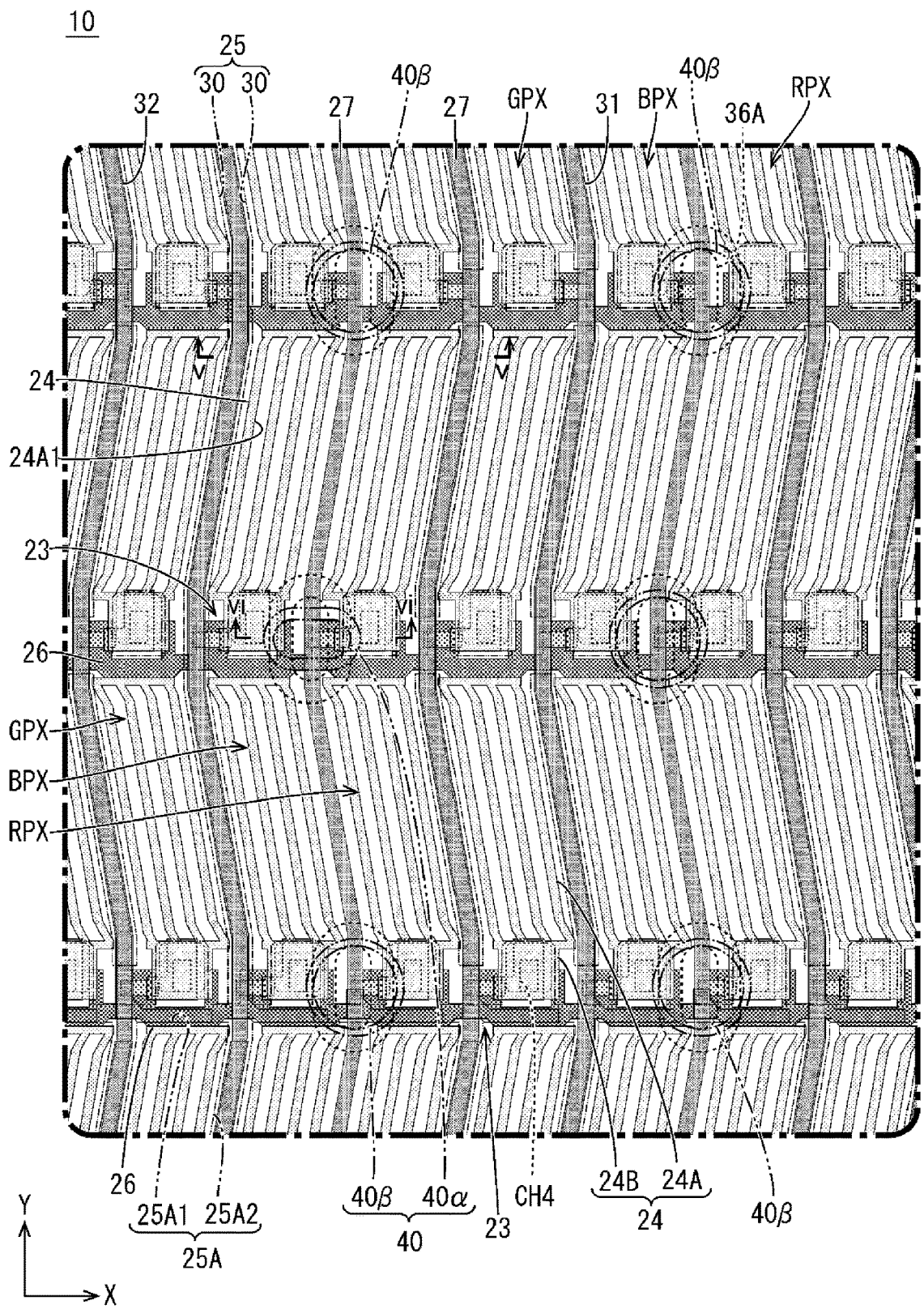
FIG. 2 is a plan view illustrating a pixel arrangement in a display region of the liquid crystal panel, and illustrates a first metal film, a semiconductor film, a second metal film, and a second transparent electrode film with different shading.

A pixel arrangement in the display region AA of the array substrate 21 will now be described with reference to FIG. 2. In FIG. 2, a first metal film, a semiconductor film, a second metal film, and a second transparent electrode film included in the array substrate 21 are illustrated with different shading. Note that, in FIG. 2, the components and the like of a first transparent electrode film and the counter substrate 20 are indicated by chain double-dashed lines. Further, the respective films provided on the array substrate 21 described above will be described in detail below. As illustrated in FIG. 2, on the inner face side of the display region AA of the array substrate 21, a plurality of thin film transistors (TFTs; switching elements) 23 and a plurality of pixel electrodes 24 are provided side by side spaced apart on an inner face side of the display region AA of the array substrate 21. The plurality of the TFTs 23 and the plurality of pixel electrodes 24 are provided side by side in a matrix shape and spaced apart in the X-axis direction (first direction) and the Y-axis direction (second direction) intersecting the X-axis direction. The gate wiring lines (third wiring lines, scanning wiring lines) 26 and source wiring lines (signal wiring lines) 27, which are formed in a lattice pattern, surround the TFT 23 and the pixel electrode 24. The gate wiring line 26 extends substantially linearly in the X-axis direction, and a plurality of the gate wiring lines 26 are disposed side by side spaced apart in the Y-axis direction, sandwiching the pixel electrode 24 therebetween. A line width of the gate wiring line 26 changes depending on the position thereof in the X-axis direction. The source wiring line 27 extends substantially in the Y-axis direction while being repeatedly bent into a zigzag shape. A plurality of the source wiring lines 27 are disposed side by side spaced apart in the X-axis direction, sandwiching the pixel electrode 24 therebetween. The gate wiring line 26 and the source wiring line 27 intersect each other, and a number of intersections thereof is a value obtained by multiplying the number of gate wiring lines 26 installed by the number of source wiring lines 27 installed. The TFT 23 is interposed between the pixel electrode 24 and the gate wiring line 26, which are connected to the TFT 23, in the Y-axis direction. Note that the plurality of TFTs 23 include those positioned on the right side in FIG. 2 with respect to the source wiring line 27 to be connected thereto, and those positioned on the left side in the same drawing. Two of the TFTs 23 positioned on the right side in FIG. 2 with respect to the source wiring line 27 to be connected thereto and two of the TFTs 23 positioned on the left side in the same drawing are alternately aligned two by two in the Y-axis direction. Further, all of the TFTs 23 are positioned on the lower side in FIG. 2 with respect to the pixel electrodes 24 to be connected thereto.

Figure 3:
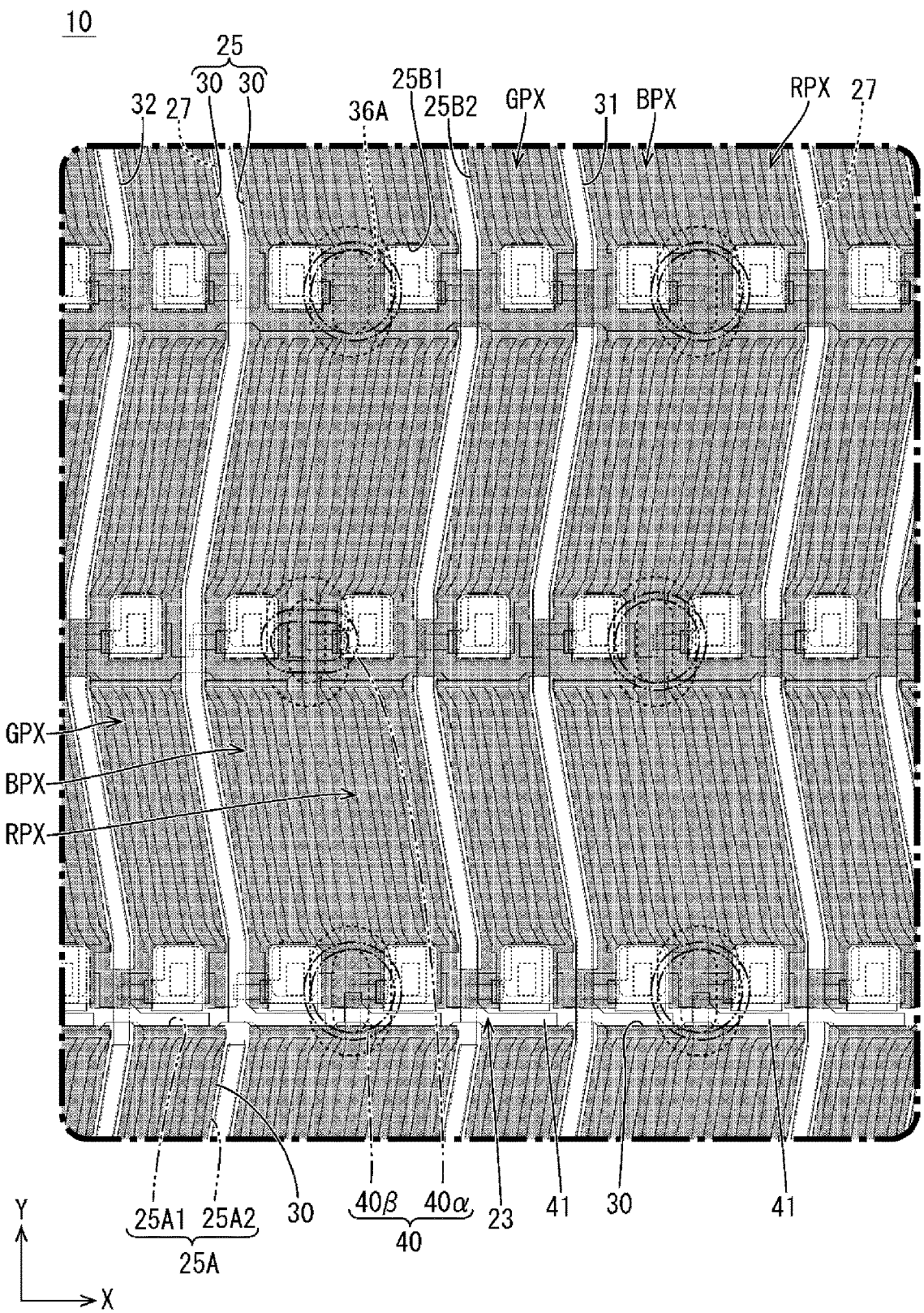
FIG. 3 is a plan view illustrating the same range as in FIG. 2, and illustrates a first transparent electrode film with shading.

Next, a common electrode 25 provided on the array substrate 21 will be described with reference to FIG. 1 and FIG. 3. In FIG. 3, the first transparent electrode film included in the array substrate 21 is illustrated with shading. As illustrated in FIG. 3, the array substrate 21 is provided with the common electrode 25 disposed across substantially the entire display region AA. The common electrode 25 overlaps a lower-layer side of the plurality of pixel electrodes 24. As illustrated in FIG. 1 and FIG. 3, the common electrode 25 constitutes the touch electrode 30 described above. A slit 25A partitioning the touch electrodes 30 adjacent to each other is formed in the common electrode 25. The slit 25A forms a substantially lattice pattern as a whole in plan view. The slit 25A is composed of a first slit 25A1 that crosses the common electrode 25 over an entire length thereof in the substantially X-axis direction and a second slit 25A2 that crosses the common electrode 25 over an entire length thereof in the substantially Y-axis direction. Note that, in FIG. 3, four touch electrodes 30 are illustrated. The common electrode 25 is composed of the plurality of touch electrodes 30 that are partitioned by the slit 25A in a substantially grid pattern in plan view and are each electrically independent of the other. The touch electrodes 30 aligned in the Y-axis direction are partitioned by the first slit 25A1. The touch electrodes 30 aligned in the X-axis direction are partitioned by the second slit 25A2. A common potential signal related to the image display function and a touch signal (position detection signal) related to the touch panel function are supplied to the touch wiring line 31 connected to the touch electrode 30 from the driver 11 in a time division manner. A timing at which the common potential signal is supplied from the driver 11 to the touch wiring line 31 is a display period. A timing at which the touch signal is supplied from the driver 11 to the touch wiring line 31 is a sensing period (position detection period). This common potential signal is transmitted to all of the touch wiring lines 31 at the same timing (display period). As a result, all of the touch electrodes 30 are at the reference potential based on the common potential signal and thus function as the common electrode 25. Further, the common electrode 25 is formed with a first opening 25B1 that overlaps a greater portion of the TFT 23 (in the vicinity of a third contact hole CH3 and a fourth contact hole CH4 described below). A plurality of the first openings 25B1 are formed at positions in the common electrode 25 which overlap the plurality of TFTs 23, respectively. The plurality of first openings 25B1 are disposed side by side in a matrix shape spaced apart in the X-axis direction and the Y-axis direction in the common electrode 25. Short-circuiting of the common electrode 25 to the pixel electrode 24 is avoided by the first openings 25B1. Further, the common electrode 25 is formed with a second opening 25B2 overlapping greater portions of the touch wiring line 31 and the connection wiring line 32.

Figure 4:
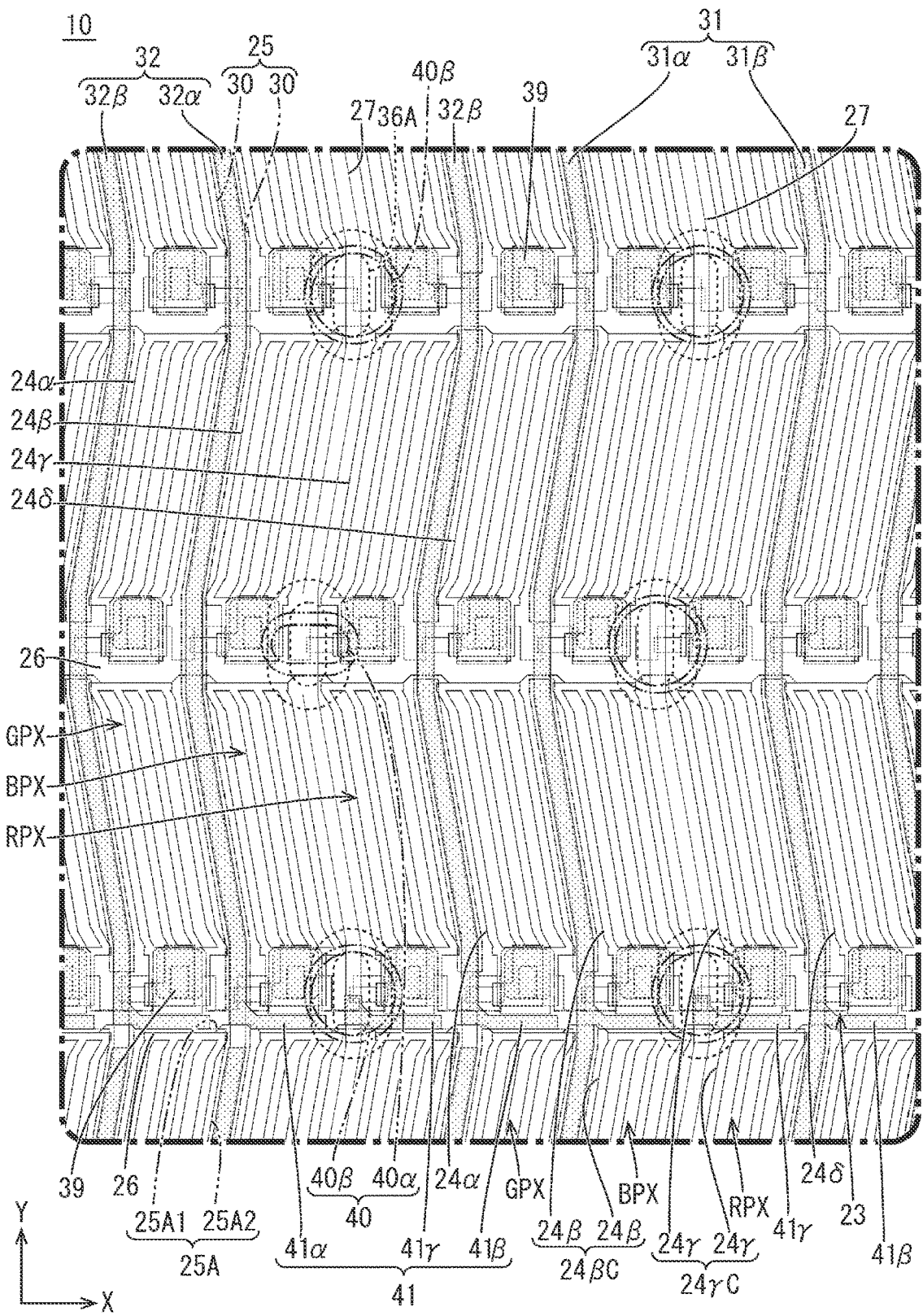
FIG. 4 is a plan view illustrating the same range as in FIG. 2, and illustrates a third metal film with shading.

The touch wiring line 31 and the connection wiring line 32 will now be described with reference to FIG. 4. In FIG. 4, the third metal film included in the array substrate 21 is illustrated with shading. Note that, in FIG. 4, the first transparent electrode film (common electrode 25 and touch electrode 30) and the like are indicated by chain double-dashed lines. As illustrated in FIG. 4, the touch wiring line 31 overlaps the source wiring line 27 in plan view. Similar to the source wiring line 27, the touch wiring line 31 extends substantially in the Y-axis direction while being repeatedly bent into a zigzag shape. The touch wiring line 31 crosses the first slit 25A1 partitioning the touch electrodes 30 adjacent to each other in the Y-axis direction. The connection wiring line 32 is in the same layer as the touch wiring line 31 and overlaps the source wiring line 27 in plan view. Similar to the source wiring line 27 and the touch wiring line 31, the connection wiring line 32 extends substantially in the Y-axis direction while being repeatedly bent into a zigzag shape. The connection wiring line 32 does not cross the first slit 25A1 partitioning the touch electrode 30 to be connected thereto and the touch electrode 30 adjacent thereto in the Y-axis direction, and is in a non-overlapping relationship with the first slit 25A1. The connection wiring line 32 is in a relationship of alignment in the Y-axis direction and being spaced apart by an amount corresponding to the first slit 25A1 with the touch wiring line 31 and the connection wiring line 32 overlapping the touch electrode 30 adjacent in the Y-axis direction to the touch electrode 30 to be connected thereto.

Figure 5:
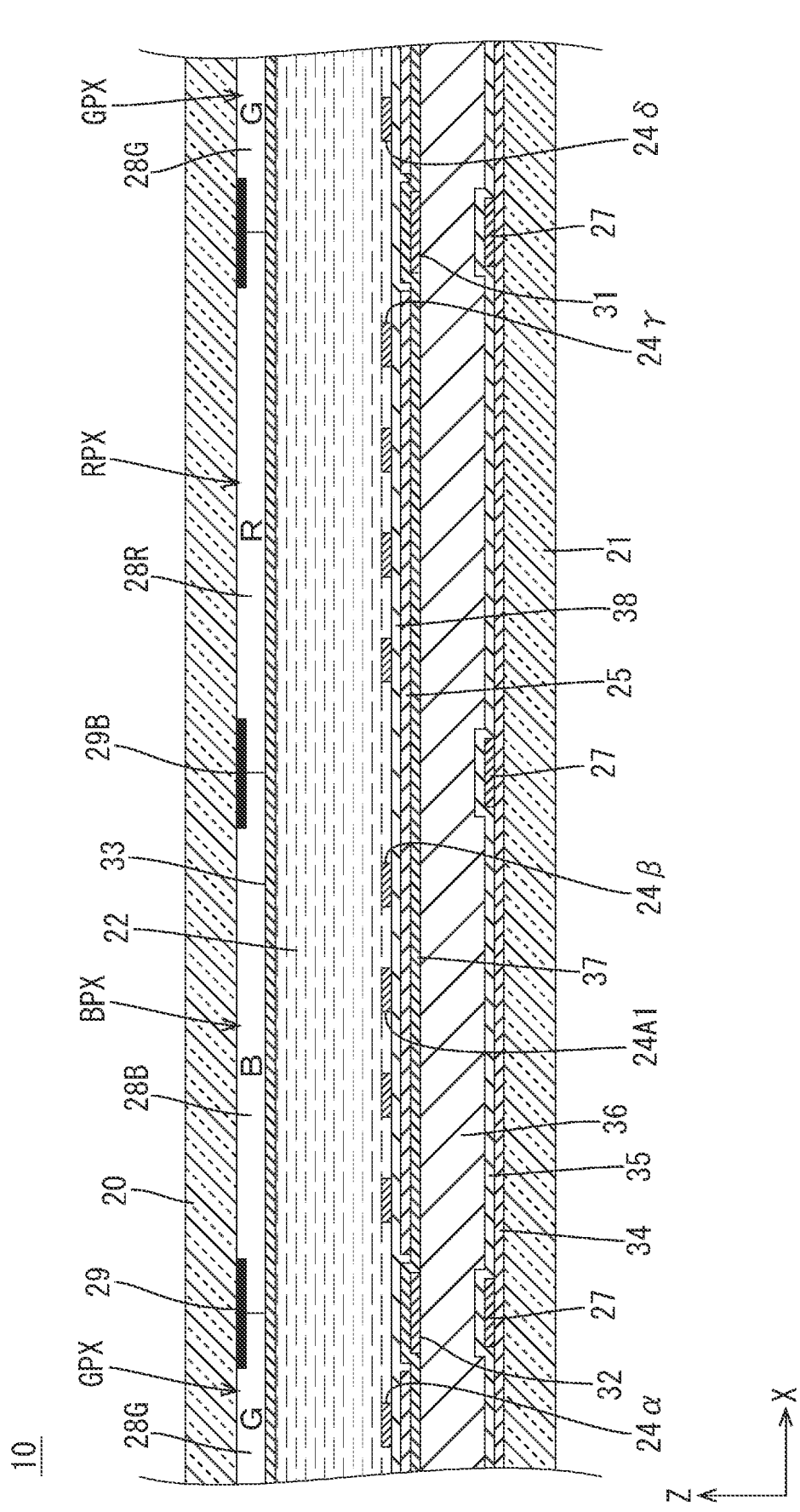
FIG. 5 is a cross-sectional view of the liquid crystal panel taken along line v-v in FIG. 2.

A cross-sectional configuration in the vicinity of a center portion of the pixel electrode 24 (pixel PX) in the liquid crystal panel 10 will now be described with reference to FIG. 5. As illustrated in FIG. 5, the liquid crystal panel 10 includes a liquid crystal layer (medium layer) 22 disposed between the pair of substrates 20, 21 and containing liquid crystal molecules, which are substances having optical characteristics that change in accordance with application of an electrical field. Three-color color filters 28 exhibiting blue (B), green (G), and red (R) are provided in the display region AA on an inner face side of the counter substrate 20 constituting the liquid crystal panel 10. The plurality of color filters 28 exhibiting colors different from each other are arranged side by side so as to be adjacent to each other in the extension direction of the gate wiring line 26 (X-axis direction). The plurality of color filters 28 that exhibit colors different from each other extend in the extension direction of the source wiring line 27 (substantially the Y-axis direction).

In this manner, the plurality of color filters 28 exhibiting colors different from each other are arrayed in a stripe pattern as a whole. These color filters 28 overlap the pixel electrodes 24 on the array substrate 21 side in plan view. The color filters 28 exhibiting colors different from each other are disposed such that boundaries thereof (color boundaries) overlap the source wiring line 27. Further, an overcoat film 33 disposed in a solid-like form over substantially the entire region of the counter substrate 20 is provided for flattening on the upper layer side (liquid crystal layer 22 side) of the color filter 28. Note that alignment films for aligning the liquid crystal molecules included in the liquid crystal layer 22 are respectively formed on innermost faces (uppermost layers) of both of the substrates 20, 21 that are in contact with the liquid crystal layer 22.

As illustrated in FIG. 5, the color filters 28 include a first color filter (green color filter) 28G exhibiting green, a second color filter (blue color filter) 28B exhibiting blue, and a third color filter (red color filter) 28R exhibiting red. In the following description, when the color filters 28 are distinguished from each other, a suffix G is appended to the reference numeral of the first color filter exhibiting green, a suffix B is appended to the reference numeral of the second color filter exhibiting blue, and a suffix R is appended to the reference numeral of the third color filter exhibiting red. The first color filter 28G selectively transmits green light having a wavelength included in a green wavelength region (approximately 500 nm to approximately 570 nm). The first color filter 28G is highest in relative luminous efficiency. The second color filter 28B selectively transmits blue light included in a blue wavelength region (approximately 400 nm to approximately 500 nm). The second color filter 28B is lowest in the relative luminous efficiency. The third color filter 28R selectively transmits red light having a wavelength included in a red wavelength region (approximately 600 nm to approximately 780 nm). The third color filter 28R is lower in the relative luminous efficiency than the first color filter 28G but higher in the relative luminous efficiency than the second color filter 28B. In the present embodiment, the color filters 28 are arrayed with the first color filter 28G, the second color filter 28B, and the third color filter 28R repeatedly arrayed side by side in this order from the left side of FIG. 5.

In this liquid crystal panel 10, as illustrated in FIG. 5, the three color filters 28G, 28B, 28R aligned in the X-axis direction and the three pixel electrodes 24 facing the three color filters 28G, 28B, 28R respectively constitute pixels GPX, BPX, RPX of three colors. The first pixel (green pixel) GPX exhibiting green, which has the highest luminosity factor, is constituted by the first color filter 28G and the pixel electrode 24 facing the first color filter 28G. The second pixel (blue pixel) BPX exhibiting blue, which has the lowest luminosity factor, is constituted by the second color filter 28B and the pixel electrode 24 facing the second color filter 28B. The third pixel (red pixel) RPX exhibiting red, which has an intermediate luminosity factor, is constituted by the third color filter 28R and the pixel electrode 24 facing the third color filter 28R. Then, this liquid crystal panel 10 is provided with display pixels configured that can display color display with predetermined gradation by the pixels GPX, BPX, RPX of the three colors adjacent to each other in the X-axis direction. An array pitch of the pixels GPX, BPX, RPX in the Y-axis direction is approximately three times an array pitch thereof in the X-axis direction.

Figure 6:
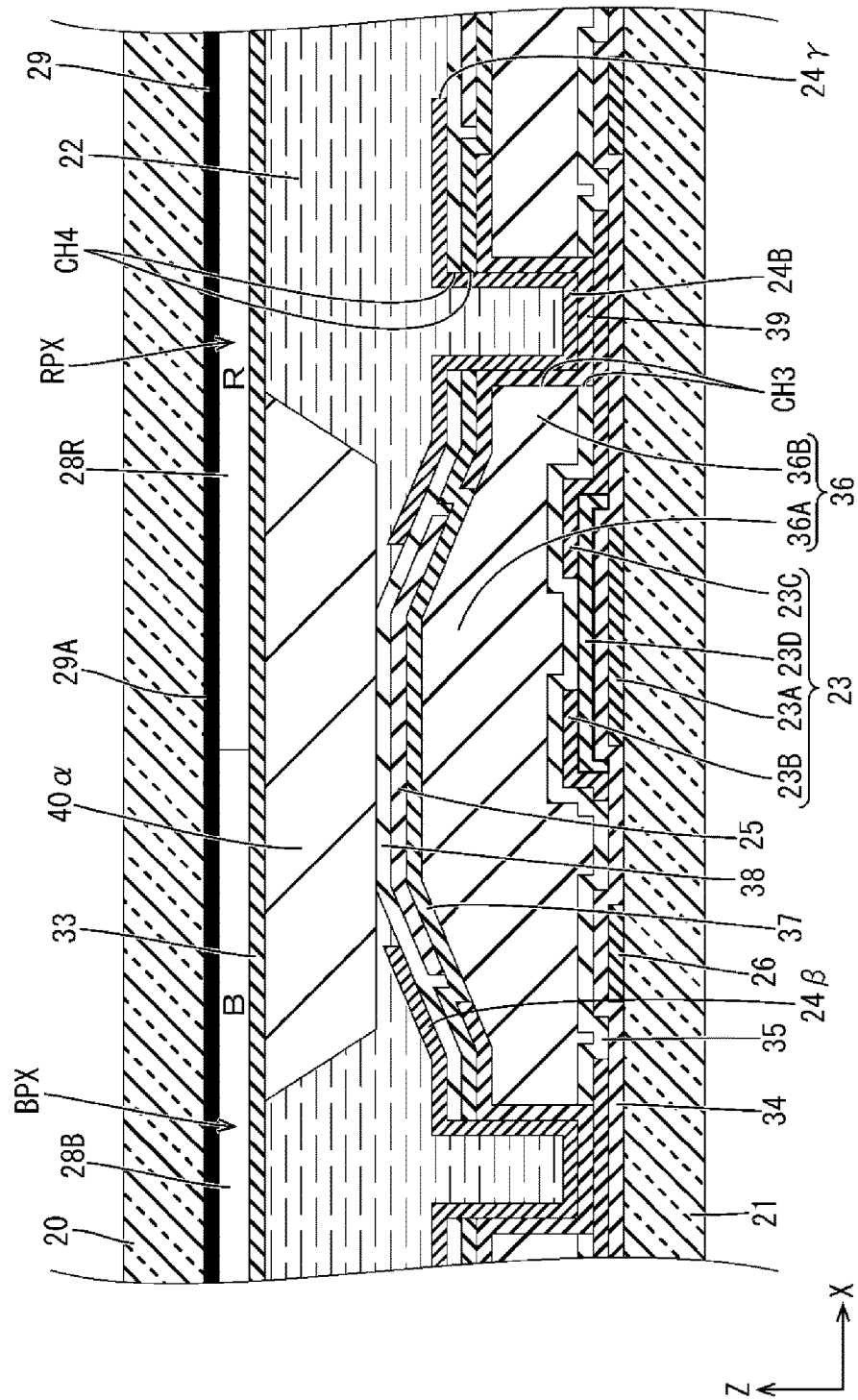
FIG. 6 is a cross-sectional view of the liquid crystal panel taken along line vi-vi in FIG. 2.

As illustrated in FIG. 5, a light-blocking portion (inter-pixel light-blocking portion, black matrix) 29 is provided on the inner face side of the counter substrate 20 in the display region AA. The light-blocking portion 29 is composed of a light-blocking material having excellent light-blocking properties (for example, a material containing a pigment such as a carbon black in a photosensitive resin material such as an acrylic or polyimide). The light-blocking portion 29 can block light emitted from a backlight device or the like. In the display region AA, the light-blocking portion 29 has a planar shape being in a substantially lattice pattern, and separates adjacent pixel electrodes 24. The light-blocking portion 29 overlaps at least the gate wiring line 26 and the source wiring line 27 on the array substrate 21 side in plan view. The light-blocking portion 29 includes a first light-blocking portion 29A extending in the X-axis direction and a second light-blocking portion 29B extending in the Y-axis direction and intersecting the first light-blocking portion 29A. Note that, in FIG. 5, only the second light-blocking portion 29B is illustrated, and the first light-blocking portion 29A is illustrated in FIG. 6 and the like. Intersections of the first light-blocking portion 29A and the second light-blocking portion 29B are continuous with each other. The first light-blocking portion 29A overlaps at least the TFT 23 and the gate wiring line 26, and is wider than the second light-blocking portion 29B. The first light-blocking portion 29A partitions two color filters 28 adjacent to each other in the Y-axis direction. The second light-blocking portion 29B overlaps at least the source wiring line 27, the touch wiring line 31, and the connection wiring line 32, and is narrower than the first light-blocking portion 29A. The second light-blocking portion 29B partitions two color filters 28 adjacent to each other in the X-axis direction. In the plane of the counter substrate 20, a region (pixel opening) surrounded by the first light-blocking portion 29A and the second light-blocking portion 29B is in a positional relationship of overlapping a greater portion of the pixel electrode 24 and a greater portion of the color filter 28. The above-described region transmits transmission light of the pixel electrode 24 and the color filter 28, and emits light to the outside of the liquid crystal panel 10. Note that the light-blocking portion 29 is also provided in the non-display region NAA of the counter substrate 20, and is disposed in a solid-like form over substantially the entire region in the non-display region NAA.

The various films layered and formed on the inner face side of the array substrate 21 will now be described with reference to FIG. 6. As illustrated in FIG. 6, in the array substrate 21, a first metal film, a gate insulating film 34, a semiconductor film, a second metal film, a first interlayer insulating film 35, a flattening film (first insulating film) 36, a third metal film, a second interlayer insulating film (second insulating film) 37, a first transparent electrode film, a third interlayer insulating film 38, a second transparent electrode film, and an alignment film are formed and layered in this order from the lower-layer side (glass substrate side). The first metal film, the second metal film, and the third metal film are each a single layer film composed of one type of metal material selected from copper, titanium, aluminum, molybdenum, tungsten, and the like, or a layered film or alloy composed of a different type of metal material, and thus have conductivity and light-blocking properties. The first metal film constitutes the gate wiring line 26, a gate electrode 23A of the TFT 23, and the like. The second metal film constitutes the source wiring line 27, and a source electrode 23B and a drain electrode 23C of the TFT 23, and the like. The third metal film constitutes the touch wiring line 31, the connection wiring line 32, and the like. The semiconductor film is composed of a thin film using, for example, an oxide semiconductor or amorphous silicon as the material thereof, and constitutes a semiconductor portion 23D of the TFT 23, and the like. The first transparent electrode film and the second transparent electrode film are composed of a transparent electrode material (for example, indium tin oxide (ITO) or indium zinc oxide (IZO)). The first transparent electrode film and the second transparent electrode film have a film thickness of, for example, about 0.05 µm to 0.1 µm. The first transparent electrode film constitutes the common electrode 25 (touch electrode 30) and the like. The second transparent electrode film constitutes the pixel electrode 24 and the like. The alignment film is as described above.

The gate insulating film 34, the first interlayer insulating film 35, the second interlayer insulating film 37, and the third interlayer insulating film 38 are each formed of an inorganic material such as silicon nitride ($SiN_x$) or silicon oxide ($SiO_2$). The gate insulating film 34, the first interlayer insulating film 35, the second interlayer insulating film 37, and the third interlayer insulating film 38 have a film thickness of, for example, about 0.2 µm to 0.7 µm, which is generally larger than those of the first transparent electrode film and the second transparent electrode film. The flattening film 36 is made of, for example, an organic material such as PMMA (acrylic resin) and has photosensitivity. The flattening film 36 has a film thickness of, for example, about 1 µm to 3 µm, which is much larger than the film thicknesses of the gate insulating film 34, the first interlayer insulating film 35, the second interlayer insulating film 37, and the third interlayer insulating film 38. This flattening film 36 flattens an inner face of the array substrate 21 (surface on the liquid crystal layer 22 side). The gate insulating film 34 maintains an insulated state between the first metal film on the lower-layer side and the semiconductor film and the second metal film on the upper-layer side. For example, an intersection between the gate wiring line 26 composed of the first metal film and the source wiring line 27 composed of the second metal film is maintained in an insulated state by the gate insulating film 34. In addition, in the TFT 23, an overlapping area between the gate electrode 23A composed of the first metal film and the semiconductor portion 23D composed of the semiconductor film is maintained in an insulated state by the gate insulating film 34. The first interlayer insulating film 35 and the flattening film 36 maintain an insulated state between the semiconductor film and the second metal film on the lower-layer side and the third metal film on the upper-layer side. For example, an overlapping area between the source wiring line 27 composed of the second metal film and the touch wiring line 31 or the connection wiring line 32 composed of the third metal film is maintained in an insulated state by the first interlayer insulating film 35 and the flattening film 36. The second interlayer insulating film 37 maintains the insulated state between the third metal film on the lower-layer side and the first transparent electrode film on the upper-layer side. For example, an overlapping area between the touch wiring line 31, the connection wiring line 32, and the like composed of the third metal film, and the common electrode 25 (touch electrode 30) formed of the first transparent electrode film is maintained in an insulated state by the second interlayer insulating film 37. The third interlayer insulating film 38 maintains an insulated state between the first transparent electrode film on the lower-layer side and the second transparent electrode film on the upper-layer side. For example, an overlapping area between the common electrode 25 (touch electrode 30) composed of the first transparent electrode film and the pixel electrode 24 composed of the second transparent electrode film is maintained in the insulated state by the third interlayer insulating film 38.

Figure 7:
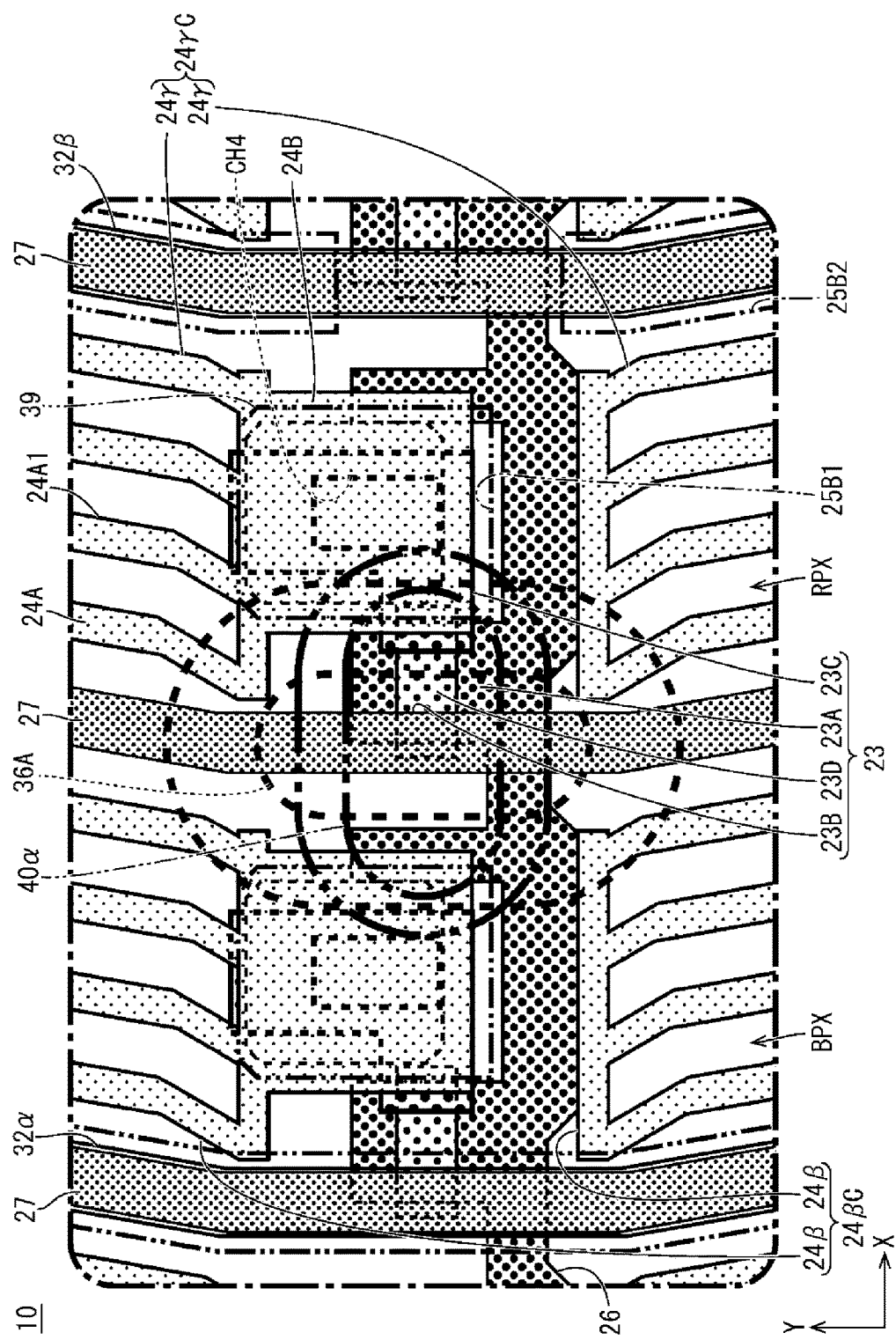
FIG. 7 is an enlarged plan view illustrating a part (vicinity of a main spacer) of FIG. 2.
Figure 8:
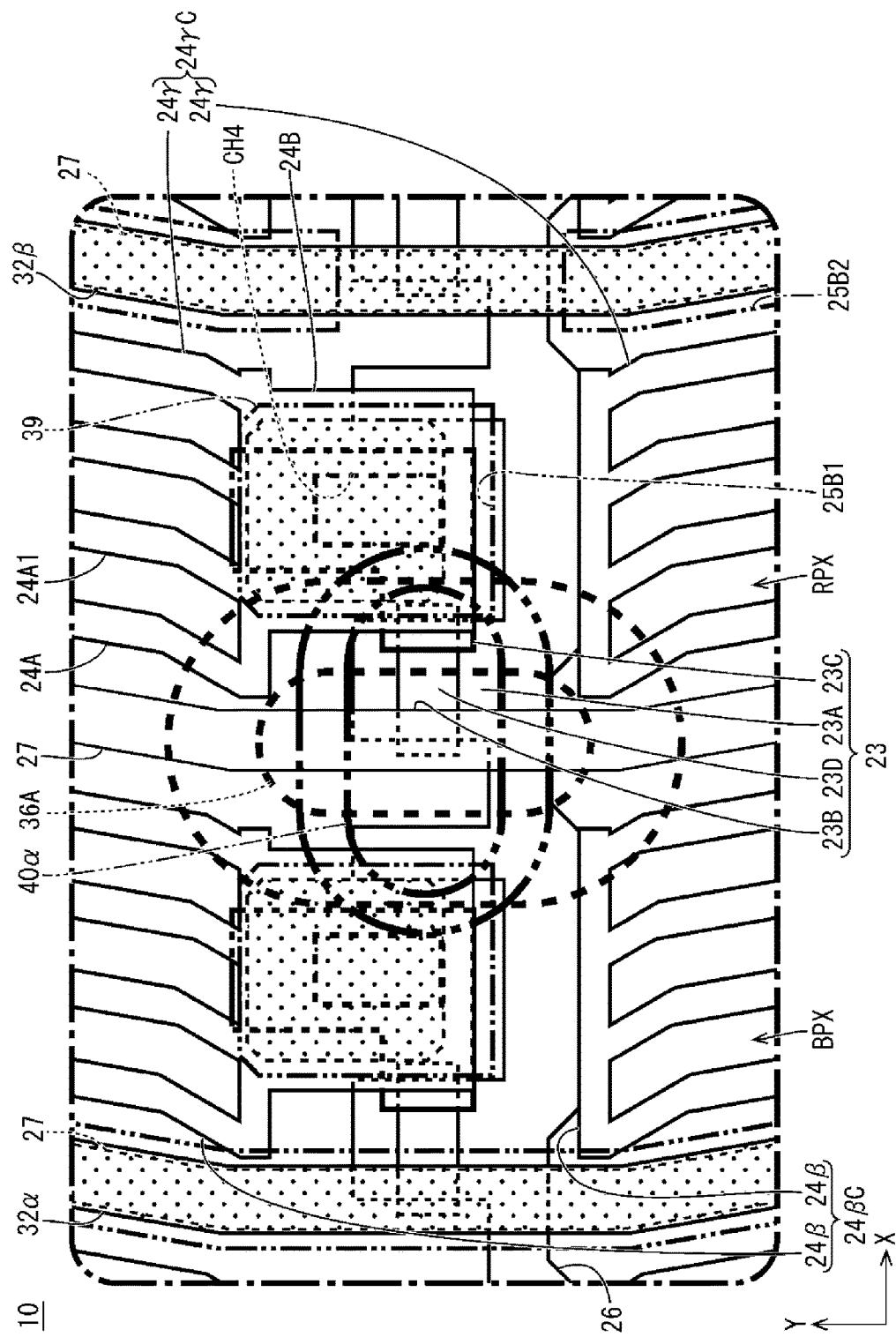
FIG. 8 is an enlarged plan view illustrating a part (vicinity of the main spacer) of FIG. 4.

Next, the TFT 23 will be described with reference to FIG. 6 to FIG. 8. In FIG. 7, the first metal film, the semiconductor film, the second metal film, and the second transparent electrode film included in the array substrate 21 are illustrated with different shading. In FIG. 8, the third metal film included in the array substrate 21 is illustrated with shading. Note that, in FIG. 7 and FIG. 8, the components and the like of the first transparent electrode film and the counter substrate 20 are indicated by chain double-dashed lines. As illustrated in FIG. 6 to FIG. 8, the TFT 23 includes the gate electrode 23A composed of the first metal film. The gate electrode 23A is constituted by a portion of the gate wiring line 26 (in the vicinity of the intersection between the gate wiring line 26 and the source wiring line 27). The gate electrode 23A is formed by partially widening the gate wiring line 26. The gate electrode 23A drives the TFT 23 on the basis of a scanning signal supplied to the gate wiring line 26. The TFT 23 includes the source electrode 23B composed of the second metal film. The source electrode 23B is constituted by a portion of the source wiring line 27 (intersection between the source wiring line 27 and the gate wiring line 26). The source electrode 23B is disposed at one end of the TFT 23 in the X-axis direction (left end illustrated in FIG. 6 and FIG. 8). The source electrode 23B overlaps a portion of the gate electrode 23A and is connected to the semiconductor portion 23D.

As illustrated in FIG. 6 to FIG. 8, the TFT 23 includes the drain electrode 23C composed of the second metal film. The drain electrode 23C is disposed at a position spaced apart from the source electrode 23B in the X-axis direction, that is, at the other end of the TFT 23 in the X-axis direction (right end illustrated in FIG. 6 and FIG. 8). The drain electrode 23C forms a substantially L-shape in plan view. An end portion of the drain electrodes 23C on the source electrode 23B side overlaps a portion of the gate electrode 23A and is connected to the semiconductor portion 23D. The drain electrode 23C is connected to the pixel electrode 24 at an end portion on a side opposite to the source electrode 23B side. An intermediate electrode 39 composed of the third metal film is provided at a position overlapping both the drain electrode 23C and the pixel electrode 24 (contact portion 24B described below). The intermediate electrode 39 is positioned between the drain electrode 23C and the pixel electrode 24 in the Z-axis direction. The intermediate electrode 39 has a substantially rectangular island shape in plan view, and is physically separated from the touch wiring line 31 and the connection wiring line 32 composed of other portions of the same third metal film. In the first interlayer insulating film 35 and the flattening film 36 interposed between the drain electrode 23C and the intermediate electrode 39, the third contact hole CH3 is formed at a position overlapping the drain electrode 23C and the intermediate electrode 39. The intermediate electrode 39 is connected to the drain electrode 23C through the third contact hole CH3. In the second interlayer insulating film 37 and the third interlayer insulating film 38 interposed between the intermediate electrode 39 and the pixel electrode 24, the fourth contact hole CH4 is formed at a position overlapping the intermediate electrode 39 and the pixel electrode 24. The pixel electrode 24 is connected to the intermediate electrode 39 through the fourth contact hole CH4. Thus, the pixel electrode 24 is connected to the drain electrode 23C via the intermediate electrode 39.

As illustrated in FIG. 6 and FIG. 8, the TFT 23 includes the semiconductor portion 23D having an island shape and including a channel portion. The semiconductor portion 23D forms a horizontally elongated rectangular shape in plan view. The semiconductor portion 23D overlaps the gate electrode 23A with the gate insulating film 34 interposed therebetween. One end side portion of the semiconductor portion 23D is connected to the source electrode 23B. The other end side portion of the semiconductor portion 23D is connected to the drain electrode 23C. A portion of the semiconductor portion 23D which overlaps the gate electrode 23A but does not overlap the source electrode 23B and the drain electrode 23C is a channel portion that functions as a channel (current path). A portion of the semiconductor portion 23D which overlaps the source electrode 23B and the drain electrode 23C is a portion that does not function as a channel. When the TFT 23 is in an on state on the basis of a scanning signal supplied to the gate electrode 23A, an image signal (data signal) supplied to the source wiring line 27 is supplied from the source electrode 23B to the drain electrode 23C via the semiconductor portion 23D. As a result, the pixel electrode 24 is charged to the potential based on the image signal.

The pixel electrode 24 will now be described with reference to FIG. 2, FIG. 5, and FIG. 7. As illustrated in FIG. 2, FIG. 5, and FIG. 7, the pixel electrode 24 includes a pixel electrode main body 24A having a planar shape being a substantially rectangular shape that is vertically elongated. A long side of the pixel electrode main body 24A extends along the source wiring line 27. Specifically, both side edges of the pixel electrode main body 24A in the longitudinal direction are slightly inclined relative to the Y-axis direction. A plurality of slits 24A1 (three slits in FIG. 2, FIG. 5, FIG. 7, and the like) which extend in the long side direction thereof (substantially the Y-axis direction) are formed in the pixel electrode main body 24A. Note that a specific number of installations, a shape, a formation range, and the like of the slits 24A1 can be changed as appropriate to other than those illustrated in the drawings. In addition, the pixel electrode 24 includes the contact portion 24B protruding to one side in the Y-axis direction from the pixel electrode main body 24A. The contact portion 24B protrudes downward from the pixel electrode main body 24A in FIG. 2, FIG. 5, and FIG. 7, and overlaps a greater portion of the drain electrode 23C. The contact portion 24B is an area of the pixel electrode 24 that is connected to the drain electrode 23C (refer to FIG. 6).

As illustrated in FIG. 2 and FIG. 6, the counter substrate 20 is provided with a spacer 40 for maintaining a gap between the pair of substrates 20, 21. The spacer 40 protrudes in the Z-axis direction (normal direction of the plate surface of the counter substrate 20) from the counter substrate 20 toward the array substrate 21 side. Specifically, the spacer 40 is composed of a resin material, protrudes in the Z-axis direction from a surface of the overcoat film 33 in the display region AA of the counter substrate 20 toward the array substrate 21 side, and a protrusion tip end face thereof faces the array substrate 21. The spacer 40 has a slightly tapered cylindrical shape as a whole. The spacer 40 overlaps the intersection between the gate wiring line 26 and the source wiring line 27 provided on the array substrate 21. The spacer 40 overlaps an intersection between the first light-blocking portion 29A and the second light-blocking portion 29B constituting the light-blocking portion 29. Here, an alignment failure occurs in the liquid crystal molecules contained in the liquid crystal layer 22 in the vicinity of the spacer 40, and there is concern that a display failure caused by the alignment failure, such as a bright spot defect in which light is constantly transmitted (light leakage), may occur. In this respect, the light-blocking portion 29 overlapping the spacer 40 makes it difficult to visually confirm a display failure that may occur in the vicinity of the spacer 40.

The spacer 40 will now be described in detail with reference to FIG. 6, FIG. 7, FIG. 9, and FIG. 10. The spacer 40 includes two types of spacers, a main spacer (first spacer) 40α illustrated in FIG. 6 and FIG. 7 and a sub-spacer (second spacer) 40β illustrated in FIG. 9 and FIG. 10. Note that, in the following description, when the spacers 40 are distinguished from each other, a suffix "α" is appended to the reference numeral of the main spacer, and a suffix "β" is appended to the reference numeral of the sub-spacer, and when the spacers 40 are collectively referred to without distinction, a suffix is not appended to the reference numeral. As illustrated in FIG. 6, the main spacer 40α has a protrusion dimension from the counter substrate 20 which is larger than that of the sub-spacer 40β. In the main spacer 40α, a protrusion tip end face thereof is in contact with the inner face (alignment film) of the array substrate 21. Thereby, the pair of substrates 20, 21 are configured to maintain a gap (cell gap) corresponding to the thickness of the liquid crystal layer 22. Further, as illustrated in FIG. 7, the main spacer 40α has a horizontally elongated elliptical planar shape.

Figure 9:
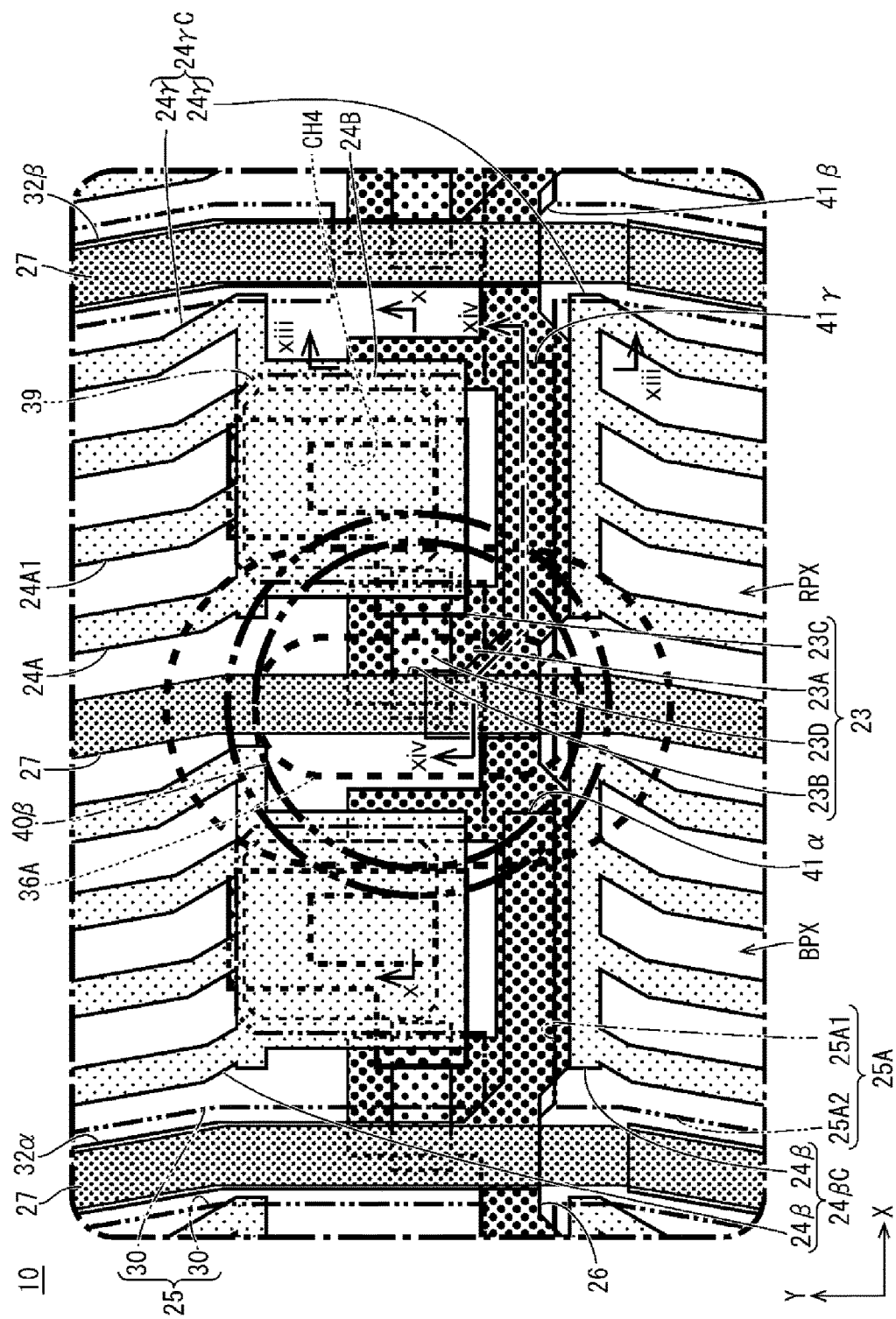
FIG. 9 is an enlarged plan view illustrating a part (vicinity of a first slit) of FIG. 2.
Figure 10:
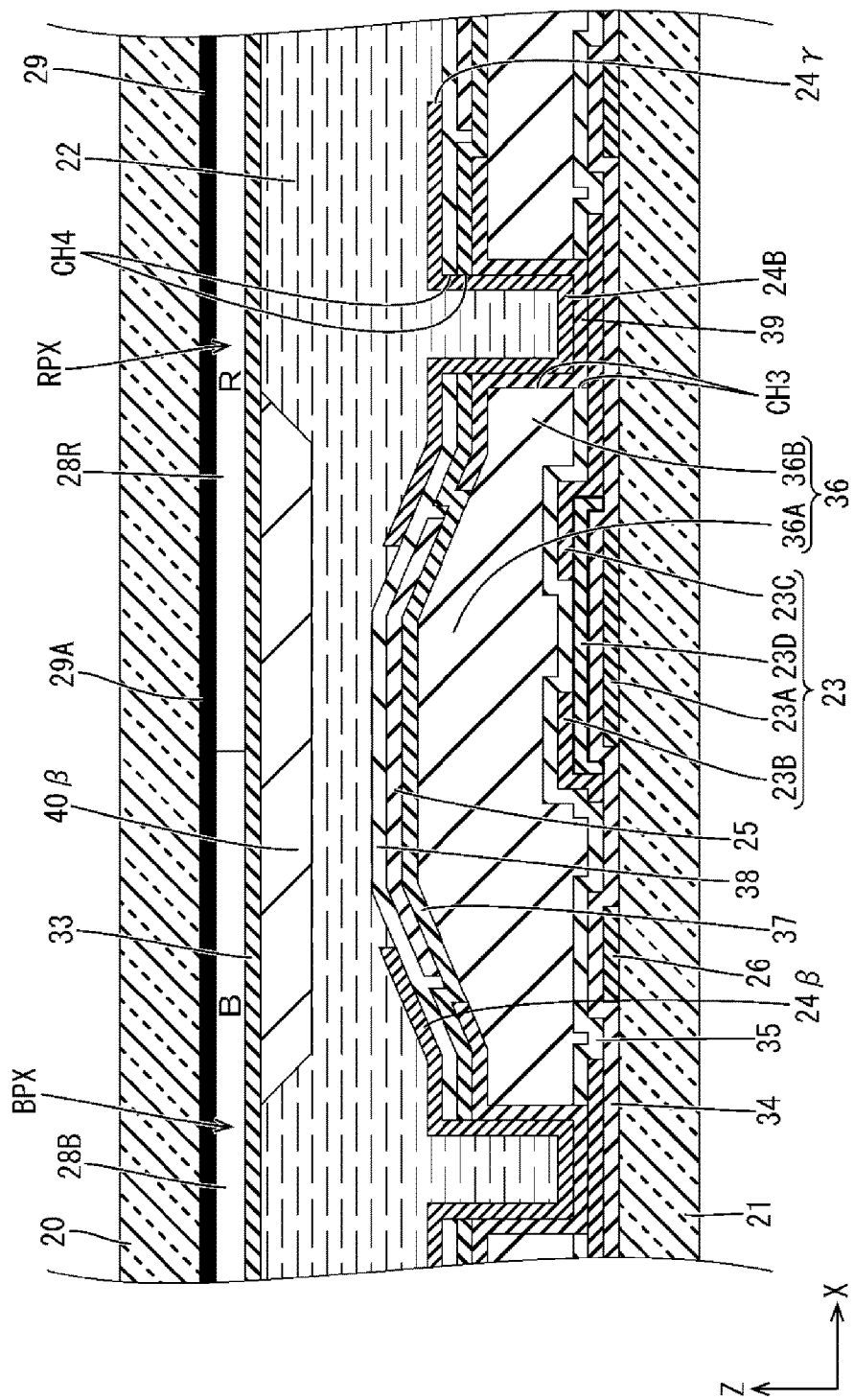
FIG. 10 is a cross-sectional view of the liquid crystal panel taken along line x-x in FIG. 9.

On the other hand, as illustrated in FIG. 10, the sub-spacer 40β has a protrusion dimension from the counter substrate 20 which is smaller than that of the main spacer 40α. A clearance is formed between the protrusion tip end face of the sub-spacer 40β and the inner face of the array substrate 21. When external force is applied, pressing any one of the pair of substrates 20, 21 inward from the outside, deflection (deformation) is allowed for any one of the pair of substrates 20, 21 by the degree of clearance between the sub-spacer 40β provided in the counter substrate 20 and the inner face of the array substrate 21. However, when any one of the pair of substrates 20, 21 deflects in some degree, the protrusion tip end face of the sub-spacer 40β is brought into contact with the inner face of the array substrate 21. Thereby, further deflection of any one of the pair of substrates 20, 21 is regulated. With the sub-spacer 40β coming into contact with the inner face of the array substrate 21 being continually avoided, the portion of the alignment film on the inner face of the array substrate 21 that overlaps the sub-spacer 40β is less likely to be scraped by the sub-spacer 40β. This allows the light-blocking range in the vicinity of the sub-spacer 40β to be narrower than the light-blocking range in the vicinity of the main spacer 40α, which is suitable for maintaining high aperture ratios for the pixels GPX, BPX, RPX. In particular, with the number of installations of the sub-spacers 40β set greater than the number of installations of the main spacers 40α, the aperture ratios of the pixels GPX, BPX, RPX can be kept high. As described above, the thickness of the liquid crystal layer 22, that is, the cell gap, can be maintained by the main spacer 40α and the sub-spacer 40β. Further, as illustrated in FIG. 9, the sub-spacer 40β has a substantially circular planar shape. A diameter dimension of the sub-spacer 40β is about the same as a major axis dimension of the sub-spacer 40β.

Next, the flattening film 36 of the array substrate 21 will be described with reference to FIG. 6, FIG. 7, FIG. 9, and FIG. 10. As illustrated in FIG. 6 and FIG. 10, in the flattening film 36, a portion overlapping the spacer 40 and other portions differ in film thickness. The portion of the flattening film 36 that overlaps the spacer 40 is a higher portion (first film thick portion) 36A higher than the other portions. The portions of the flattening film 36 that do not overlap the spacer 40 constitute a lower portion 36B lower than the higher portion 36A. The higher portion 36A has a larger film thickness than the lower portion 36B. The lower portion 36B has a film thickness smaller than that of the higher portion 36A but larger than those of the other insulating films 34, 35, 37, 38. The lower portion 36B occupies a greater portion of the flattening film 36 excluding portions overlapping each of the plurality of spacers 40. As illustrated in FIG. 7 and FIG. 9, the higher portion 36A has a vertically elongated elliptical planar shape. The higher portion 36A overlaps the intersection between the gate wiring line 26 and the source wiring line 27. As illustrated in FIG. 6 and FIG. 10, with the higher portion 36A having a film thickness larger than that of the lower portion 36B, a portion of the inner face (alignment film) of the array substrate 21 that overlaps the higher portion 36A protrudes toward the liquid crystal layer 22 side in the Z-axis direction more than the portion of the inner face of the array substrate 21 that overlaps the lower portion 36B. The higher portion 36A has a tapered shape, and a major axis dimension of the protrusion tip end face thereof is larger than a minor axis dimension of the protrusion tip end face of the main spacer 40α and is equal to a diameter dimension of the protrusion tip end face of the sub-spacer 40β. Accordingly, the higher portion 36A can receive the protrusion tip end face of each spacer 40α, 40β through the alignment film or the like over substantially the entire region. Thereby, the deflection of the array substrate 21 or the counter substrate 20 can be regulated. The flattening film 36 including the higher portion 36A and the lower portion 36B is patterned by exposure and development using a half-tone mask or a gray-tone mask in the manufacturing process of the array substrate 21.

As illustrated in FIG. 4, the touch wiring line 31 and the connection wiring line 32 included in the array substrate 21 according to the present embodiment do not overlap all source wiring lines 27. That is, the plurality of source wiring lines 27 include the source wiring line 27 not overlapped by the touch wiring line 31 and the connection wiring line 32. The spacer 40 and the higher portion 36A of the flattening film 36 overlap the source wiring line 27 not overlapped by the touch wiring line 31 and the connection wiring line 32. That is, the spacer 40 and the higher portion 36A do not overlap the touch wiring line 31 and the connection wiring line 32.

In the following, regarding the plurality of pixel electrodes 24 constituting each of the pixels GPX, BPX, RPX illustrated in FIG. 4, the pixel electrode 24 of the first pixel GPX is defined as a first pixel electrode 24α, the pixel electrode 24 of the second pixel BPX adjacent to the first pixel GPX is defined as a second pixel electrode 24β, and the pixel electrode 24 of the third pixel RPX adjacent to the second pixel BPX is defined as a third pixel electrode 24γ. Further, regarding the plurality of pixel electrodes 24 constituting the plurality of first pixels GPX, the pixel electrode 24 of the first pixel GPX positioned on a side opposite to the second pixel electrode 24β with respect to the third pixel electrode 24γ in the X-axis direction is also referred to as a fourth pixel electrode 24δ. Note that, when the pixel electrodes 24 are distinguished from each other, a suffix "α" is appended to the reference numeral of the first pixel electrode, a suffix "β" is appended to the reference numeral of the second pixel electrode, a suffix "γ" is appended to the reference numeral of the third pixel electrode, and a suffix "δ" is appended to the reference numeral of the fourth pixel electrode, and when the pixel electrodes 24 are collectively referred to without distinction, a suffix is not appended to the reference numeral. The first pixel electrode 24α and the fourth pixel electrode 24δ overlap the first color filter 28G exhibiting green. The second pixel electrode 24β overlaps the second color filter 28B exhibiting blue. The third pixel electrode 24γ overlaps the third color filter 28R exhibiting red. Further, in particular, a plurality of the pixel electrodes 24 including the second pixel electrode 24β and aligned in the Y-axis direction are referred to as a second pixel electrode row 24βC, and a plurality of the pixel electrodes 24 including the third pixel electrode 24γ and aligned in the Y-axis direction is referred to as a third pixel electrode row 24γC.

Specifically, the plurality of touch wiring lines 31 include a plurality of first touch wiring lines (first wiring lines, first position detection wiring lines) 31α positioned between the first pixel electrode 24α and the second pixel electrode 24β in the X-axis direction, and a plurality of second touch wiring lines (second wiring lines, second position detection wiring lines) 31β positioned between the third pixel electrode 24γ and the fourth pixel electrode 24δ in the X-axis direction as illustrated in FIG. 4 and FIG. 5. Note that, in the following description, when the touch wiring lines 31 are distinguished from each other, a suffix "α" is appended to the reference numeral of the first touch wiring line, and a suffix "β" is appended to the reference numeral of the second touch wiring line, and when the touch wiring lines 31 are collectively referred to without distinction, a suffix is not appended to the reference numeral. The first touch wiring line 31α overlaps the source wiring line 27 interposed between the first pixel electrode 24α and the second pixel electrode 24β. The second touch wiring line 31β overlaps the source wiring line 27 interposed between the third pixel electrode 24γ and the fourth pixel electrode 24δ. The plurality of second touch wiring lines 31β include those connected to the touch electrode 30 different from the touch electrode 30 to which the first touch wiring line 31α is connected. The plurality of connection wiring lines 32 include a plurality of first connection wiring lines (first wiring lines) 32α positioned between the first pixel electrode 24α and the second pixel electrode 24β in the X-axis direction, and a plurality of second connection wiring lines (second wiring lines) 32β positioned between the third pixel electrode 24γ and the fourth pixel electrode 24δ in the X-axis direction. Note that, in the following description, when the connection wiring lines 32 are distinguished from each other, a suffix "α" is appended to the reference numeral of the first connection wiring line, and a suffix "β" is appended to the reference numeral of the second connection wiring line, and when the connection wiring lines 32 are collectively referred to without distinction, a suffix is not appended to the reference numeral. The first connection wiring line 32α overlaps the source wiring line 27 interposed between the first pixel electrode 24α and the second pixel electrode 24β. The second connection wiring line 32β overlaps the source wiring line 27 interposed between the third pixel electrode 24γ and the fourth pixel electrode 24δ.

On the other hand, as illustrated in FIG. 4, FIG. 6, and FIG. 10, the spacer 40 and the higher portion 36A are disposed between the second pixel electrode 24β and the third pixel electrode 24γ in the X-axis direction. That is, the spacer 40 and the higher portion 36A overlap the source wiring line 27 interposed between the second pixel electrode 24β and the third pixel electrode 24γ. The spacer 40 and the higher portion 36A are not positioned between the first pixel electrode 24α and the second pixel electrode 24β in the X-axis direction, and are not positioned between the third pixel electrode 24γ and the fourth pixel electrode 24δ in the X-axis direction. The spacer 40 and the higher portion 36A can also be described as being positioned between the second pixel electrode row 24βC and the third pixel electrode row 24γC in the X-axis direction. Further, three pixel electrodes 24, two source wiring lines 27, and the touch wiring line 31 and/or the connection wiring line 32 overlapping the two source wiring lines 27 are interposed between two spacers 40 (higher portions 36A) adjacent to each other in the X-axis direction. Further, a center of each of the spacer 40 and the higher portion 36A is disposed at a position that substantially matches a center position of the source wiring line 27 (touch wiring line 31 and connection wiring line 32) in the X-axis direction. The spacer 40 and the higher portion 36A overlap not only the entire region of the gate electrode 23A, the source electrode 23B, and the semiconductor portion 23D of the TFT 23, but also a portion of the drain electrode 23C. Here, with the first touch wiring line 31α and the first connection wiring line 32α composed of the third metal film being disposed on the upper-layer side of the flattening film 36 including the higher portion 36A, unevenness on the inner face of the array substrate 21 caused by the first touch wiring line 31α and the first connection wiring line 32α may occur.

In this regard, as described above, the spacer 40 is positioned between the second pixel electrode row 24βC and the third pixel electrode row 24γC and further positioned between the second pixel electrode 24β and the third pixel electrode 24γ as illustrated in FIG. 4, FIG. 6 and FIG. 10, and thus the first touch wiring line 31α and the first connection wiring line 32α positioned between the first pixel electrode 24α and the second pixel electrode 24β, and the second touch wiring line 31β and the second connection wiring line 32β positioned between the third pixel electrode 24γ and the fourth pixel electrode 24δ are in a non-overlapping relationship. This means that the higher portion 36A of the flattening film 36 overlapping the spacer 40 is in a non-overlapping relationship with the first touch wiring line 31α, the first connection wiring line 32α, the second touch wiring line 31β, and the second connection wiring line 32β. Accordingly, the occurrence of unevenness caused by the first touch wiring line 31α, the first connection wiring line 32α, the second touch wiring line 31β, and the second connection wiring line 32β is avoided in the portion of the inner face of the array substrate 21 overlapping the higher portion 36A. As described above, regardless of the settings of the line widths of the first touch wiring line 31α, the first connection wiring line 32α, the second touch wiring line 31β, and the second connection wiring line 32β, the contact area of the spacer 40 with the inner face of the array substrate 21 can be stably and sufficiently ensured. Thus, a uniformity of the cell gap is improved. In particular, this is suitable in a case in which the narrowing of the first touch wiring line 31α, the first connection wiring line 32α, the second touch wiring line 31β, and the second connection wiring line 32β progresses with the high definition of the liquid crystal panel 10.

Moreover, as illustrated in FIG. 4, FIG. 6, and FIG. 10, the spacer 40 and the higher portion 36A are positioned between the second pixel electrode 24β (second pixel electrode row 24βC) overlapping the second color filter 28B, which is lowest in the relative luminous efficiency, and the third pixel electrode 24γ (third pixel electrode row 24γC) overlapping the third color filter 28R, which is lower in the relative luminous efficiency than the first color filter 28G, and thus, even if a display failure, such as a bright spot defect in which light is constantly transmitted, occurs in the vicinity of the spacer 40 and adversely affects the display at the second pixel electrode 24β and the third pixel electrode 24γ, the effect on the overall display quality is minimal. In addition, the display at the first pixel electrode 24α overlapping the first color filter 28G, which is highest in the relative luminous efficiency, is unlikely to be adversely affected, and thus the overall display quality can be favorably maintained.

A planar arrangement of the spacer 40 and the higher portion 36A will now be described in detail. As illustrated in FIG. 4, the plurality of spacers 40 and the plurality of higher portions 36A are disposed side by side spaced apart in the Y-axis direction. Array intervals of the plurality of spacers 40 and the plurality of higher portions 36A in the Y-axis direction are substantially equal to an array interval of the gate wiring line 26 in the Y-axis direction (long side dimension of the pixel electrode 24). The plurality of spacers 40 and the plurality of higher portions 36A are spaced apart by an interval corresponding to one pixel GPX, BPX, RPX in the Y-axis direction. A number of the spacers 40 and the higher portions 36A aligned in the Y-axis direction is equal to a number of the gate wiring lines 26 (pixel electrodes 24) aligned in the Y-axis direction. In this way, all of the plurality of spacers 40 and the plurality of higher portions 36A aligned and forming rows in the Y-axis direction are positioned between the second pixel electrodes 24β (second pixel electrode row 24βC) and the third pixel electrodes 24γ (third pixel electrode row 24γC). Thus, the plurality of spacers 40 and the plurality of higher portions 36A aligned side by side spaced apart in the Y-axis direction are in a non-overlapping relationship with the first touch wiring lines 31α, the first connection wiring lines 32α, the second touch wiring lines 31β, and the second connection wiring lines 32β extending in the Y-axis direction. Accordingly, the occurrence of unevenness caused by the first touch wiring line 31α, the first connection wiring line 32α, the second touch wiring line 31β, and the second connection wiring line 32β is avoided in the portions of the inner face of the array substrate 21 overlapping the plurality of higher portions 36A aligned in the Y-axis direction, and thus the contact areas of the plurality of spacers 40 with the inner face of the array substrate 21 can be stably and sufficiently ensured. As a result, the uniformity of the cell gap is further improved. Further, the plurality of spacers 40 and the plurality of higher portions 36A are disposed side by side spaced apart in the X-axis direction. Array intervals of the plurality of spacers 40 and the plurality of higher portions 36A in the X-axis direction are about three times the array interval of the source wiring lines 27 (short side dimension of the pixel electrode 24). A number aligned in the X-axis direction of the plurality of spacers 40 and the plurality of higher portions 36A spaced apart in the X-axis direction at an interval corresponding to the three pixels GPX, BPX, RPX is one-third of the number of the source wiring lines 27 (pixel electrodes 24) aligned in the X-axis direction. Note that the lower portion 36B, which is the portion of the flattening film 36 other than the higher portion 36A, does not overlap the spacer 40 and overlaps the pixel electrode 24, the touch wiring line 31, the connection wiring line 32, and the like.

Figure 11:
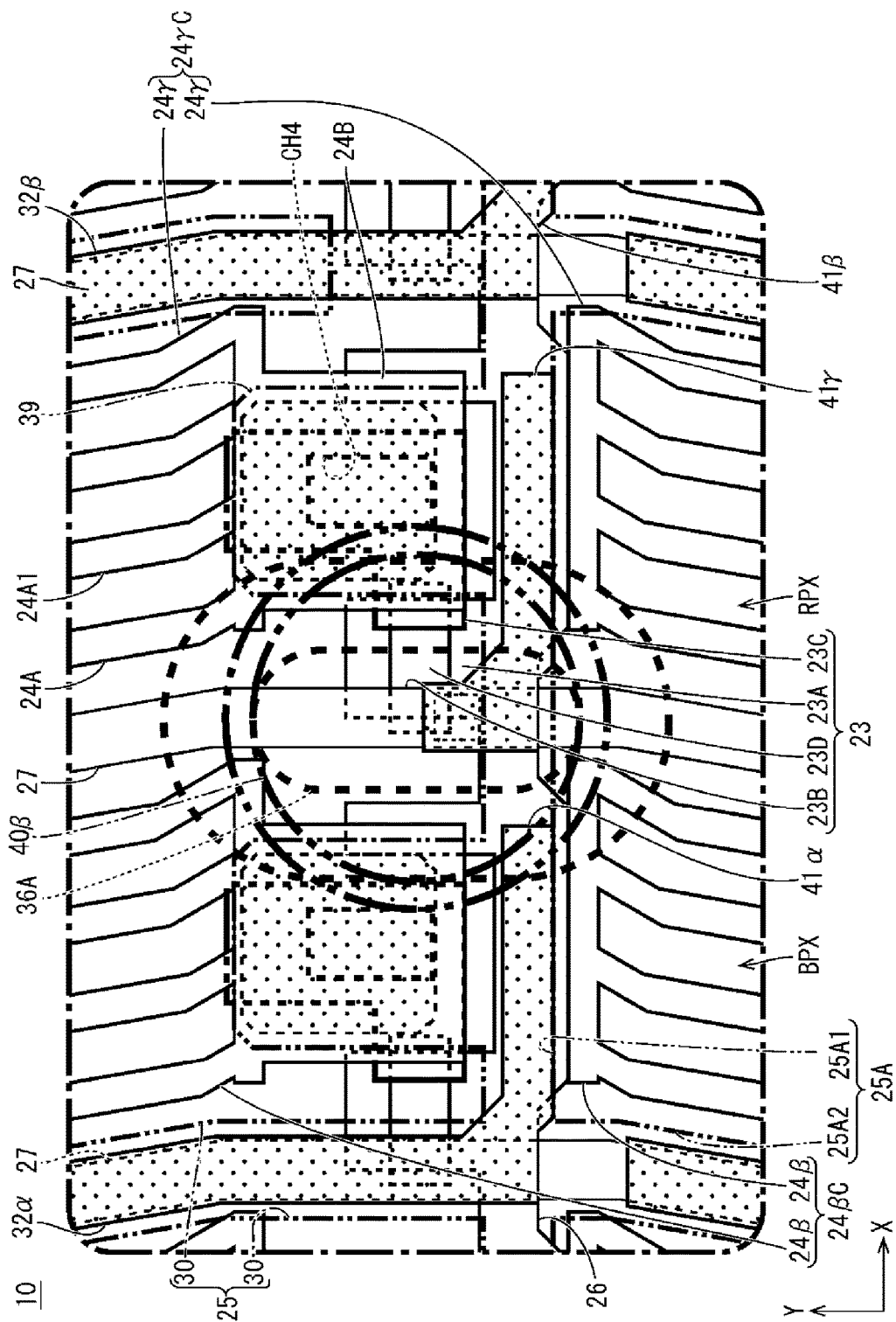
FIG. 11 is an enlarged plan view illustrating a part (vicinity of the first slit) of FIG. 4.
Figure 12:
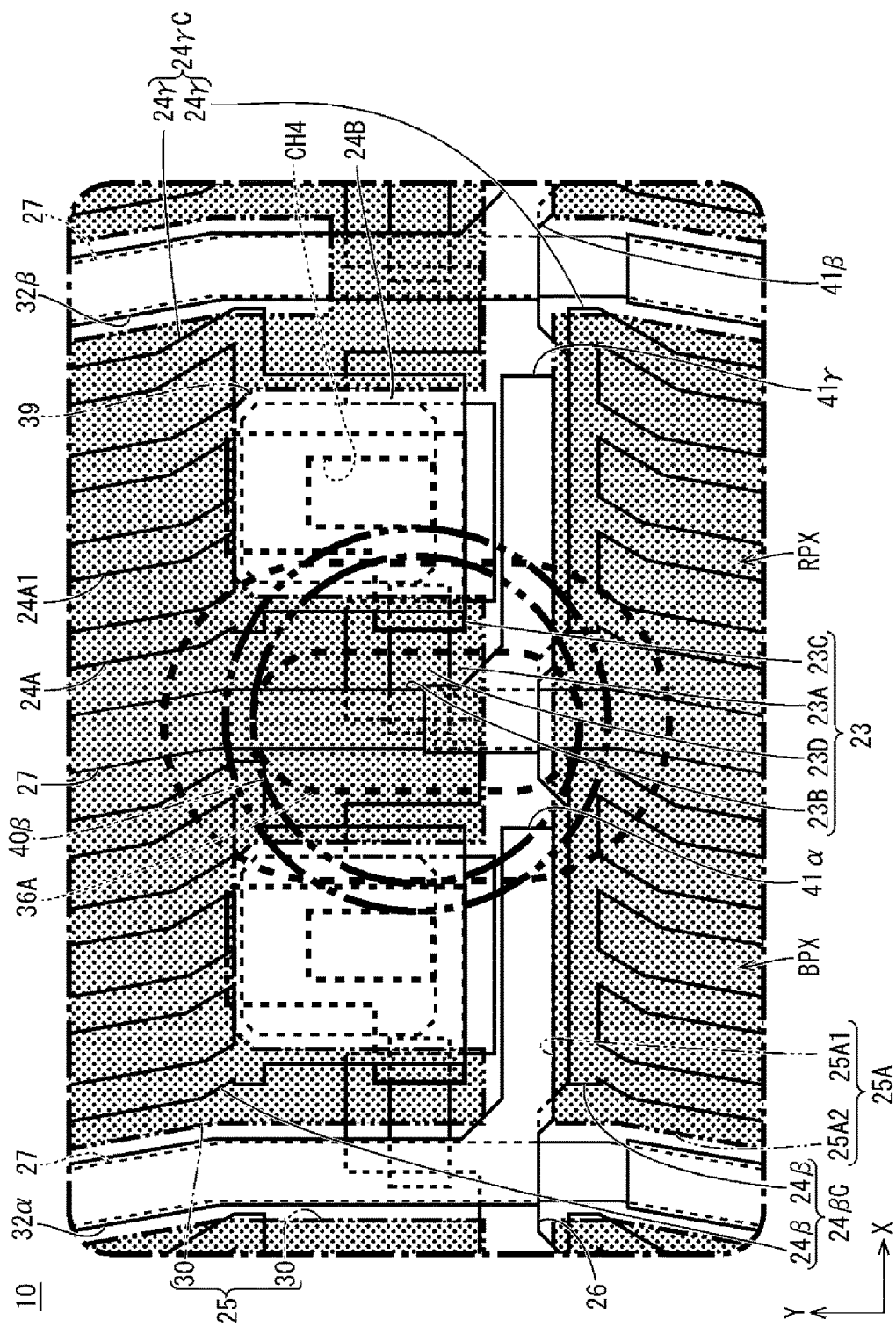
FIG. 12 is an enlarged plan view illustrating a part (vicinity of the first slit) of FIG. 3.
Figure 13:
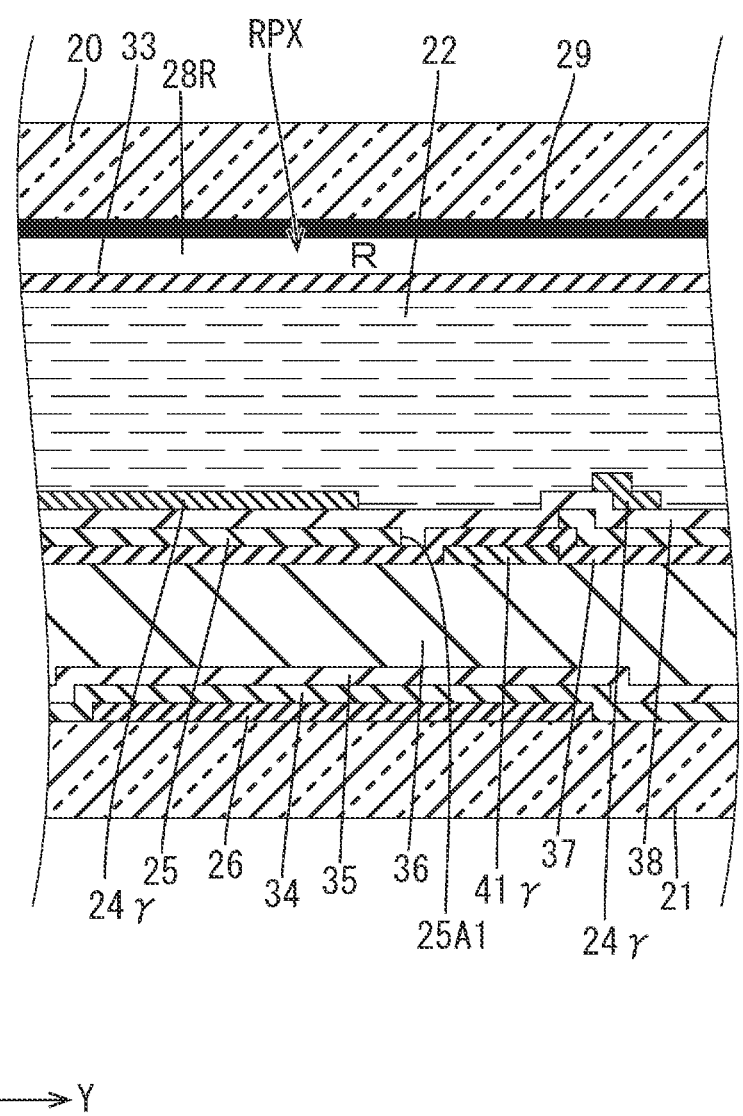
FIG. 13 is a cross-sectional view of the liquid crystal panel taken along line xiii-xiii in FIG. 9.

The configuration near a boundary of the touch electrodes 30 of the array substrate 21 adjacent to each other will now be described with reference to FIG. 4 and FIG. 11 to FIG. 14. As illustrated in FIG. 11 to FIG. 13, the array substrate 21 is provided with a blocking portion 41 positioned between two touch electrodes 30 adjacent to each other in the Y-axis direction. The boundary between two touch electrodes 30 adjacent to each other in the Y-axis direction is aligned with boundaries between two first pixel electrodes 24α, two second pixel electrodes 24β, and two third pixel electrodes 24γ adjacent to each other in the Y-axis direction. Accordingly, the gate wiring line 26 positioned between two first pixel electrodes 24α, two second pixel electrodes 24β, and two third pixel electrodes 24γ adjacent to each other in the Y-axis direction is positioned between two touch electrodes 30 adjacent to each other in the Y-axis direction. The blocking portion 41 is disposed in the same layer as the first touch wiring line 31α, the first connection wiring line 32α, the second touch wiring line 31β, and the second connection wiring line 32β. That is, the blocking portion 41 is a portion of the third metal film that differs from the intermediate electrode 39, the touch wiring line 31, and the connection wiring line 32. The blocking portion 41 extends in the X-axis direction, and a length thereof is shorter than the short side dimension of the pixel electrode 24. The blocking portion 41 overlaps at least a portion of the gate wiring line 26 positioned between two touch electrodes 30 adjacent to each other in the Y-axis direction. Note that the blocking portion 41 does not overlap many of the gate wiring lines 26 in an overlapping relationship with the touch electrode 30 among the plurality of gate wiring lines 26. Then, the blocking portion 41 is directly or indirectly connected to any one of the plurality of touch electrodes 30. Thus, the blocking portion 41 directly or indirectly connected to any one of the plurality of touch electrodes 30 overlaps at least a portion of the gate wiring line 26, thereby blocking an electric field generated from the gate wiring line 26. Moreover, the blocking portion 41 is at the same potential as the touch electrode 30 connected thereto, and thus a pixel capacitance of two first pixel electrodes 24α, two second pixel electrode 24β, and two third pixel electrode 24γ adjacent to each other in the Y-axis direction with the boundaries aligned with the boundary of two touch electrodes 30 adjacent to each other in the Y-axis direction interposed therebetween can be made equal to a pixel capacitance of the other first pixel electrodes 24α, second pixel electrodes 24β, and third pixel electrodes 24γ. As a result, the display quality can be improved.

Specifically, as illustrated in FIG. 4, the blocking portion 41 includes a first blocking portion 41α coupled to one of the first touch wiring line 31α and the first connection wiring line 32α, a second blocking portion 41β coupled to one of the second touch wiring line 31β and the second connection wiring line 32β, and a third blocking portion 41γ separated from the first touch wiring line 31α, the second touch wiring line 31β, the first blocking portion 41α, and the second blocking portion 41β. Note that, when the blocking portions 41 are distinguished from each other, a suffix "α" is appended to the reference numeral of the first blocking portion, a suffix "β" is appended to the reference numeral of the second blocking portion, and a suffix "γ" is appended to the reference numeral of the third blocking portion, and when the blocking portions 41 are collectively referred to without distinction, a suffix is not appended to the reference numeral. The first blocking portion 41α is coupled to a location where one of the first touch wiring line 31α and the first connection wiring line 32α intersects the gate wiring line 26. The first blocking portion 41α has the same potential as the touch electrode 30 connected to one of the first touch wiring line 31α and the first connection wiring line 32α. The first blocking portion 41α is positioned between two second pixel electrodes 24β adjacent to each other in the Y-axis direction. The second blocking portion 41β is coupled to a location where one of the second touch wiring line 31β and the second connection wiring line 32β intersects the gate wiring line 26. The second blocking portion 41β is positioned between two first pixel electrodes 24α (fourth pixel electrodes 24δ) adjacent to each other in the Y-axis direction. The second blocking portion 41β has the same potential as the touch electrode 30 connected to one of the second touch wiring line 31β and the second connection wiring line 32β.

Figure 14:
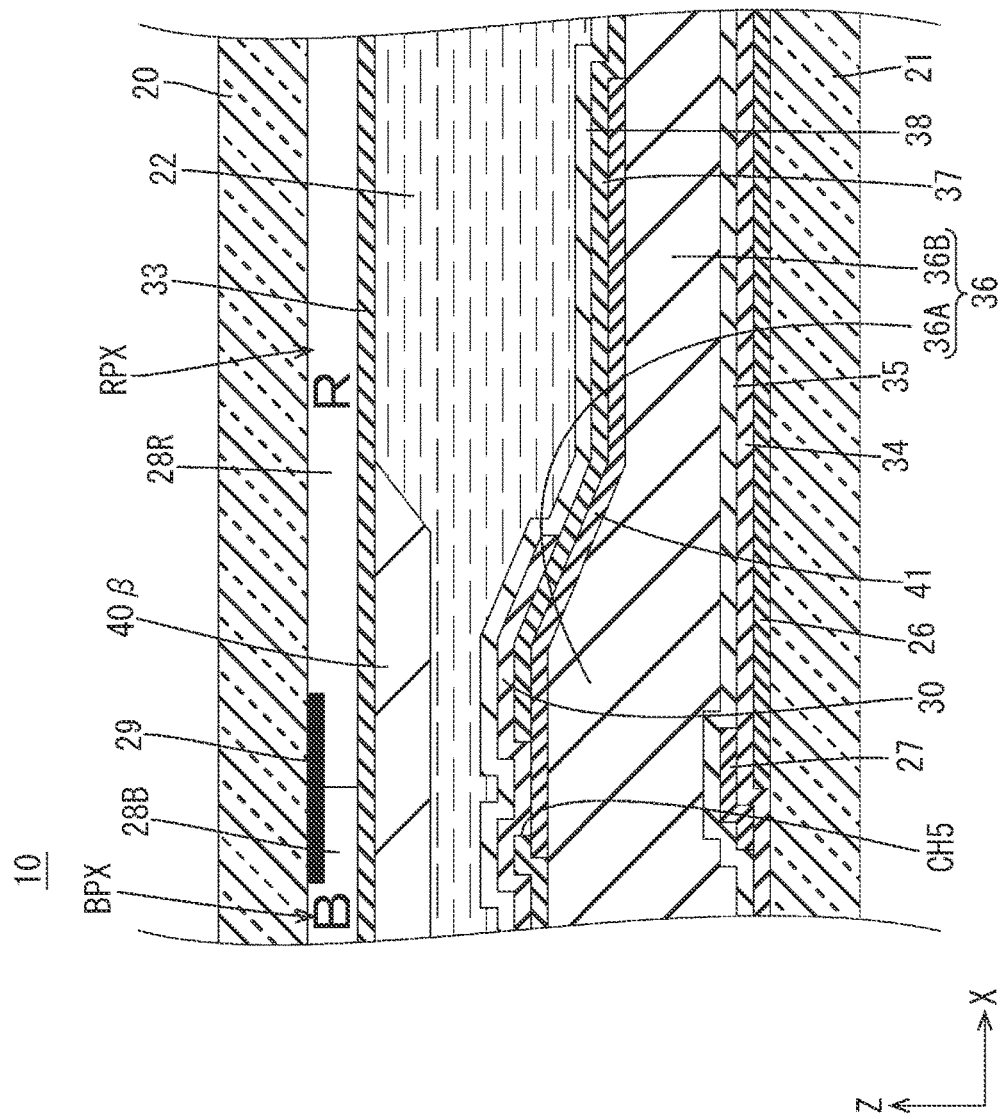
FIG. 14 is a cross-sectional view of the liquid crystal panel taken along line xiv-xiv in FIG. 9.

As illustrated in FIG. 11, the third blocking portion 41γ is physically separated from other structures composed of the third metal film, and is isolated in an island shape. The third blocking portion 41γ is positioned between two third pixel electrodes 24γ adjacent to each other in the Y-axis direction. The third blocking portion 41γ is positioned between the first blocking portion 41α and the second blocking portion 41β in the X-axis direction. The third blocking portion 41γ is mostly positioned between two touch electrodes 30 adjacent to each other in the Y-axis direction, but partially overlaps the touch electrode 30 to be connected. As illustrated in FIG. 14, in the second interlayer insulating film 37 interposed between the third blocking portion 41γ and the touch electrode 30, a fifth contact hole CH5 is formed at a position overlapping the overlapping area of the third blocking portion 41γ and the touch electrode 30. The third blocking portion 41γ is connected, through the fifth contact hole CH5, to the touch electrode 30 overlapping thereabove. Thus, the third blocking portion 41γ has the same potential as that of the touch electrode 30 being connected. When the third blocking portion 41γ is coupled to the first touch wiring line 31α, the first connection wiring line 32α, the second touch wiring line 31β, or the second connection wiring line 32β, a load difference may occur between the first touch wiring line 31α and the second touch wiring line 31β or between the first connection wiring line 32α and the second connection wiring line 32β. In this regard, by isolating the third blocking portion 41γ in an island shape as described above, the load of the first touch wiring line 31α and the load of the second touch wiring line 31β can be equalized, and the load of the first connection wiring line 32α and the load of the second connection wiring line 32β can be equalized. As a result, variation in a position detection sensitivity is less likely to occur.

Next, the planar arrangement of the spacer 40 will be described with reference to FIG. 4. As illustrated in FIG. 4, the main spacer 40α overlaps any one of the plurality of touch electrodes 30. That is, any one of the plurality of spacers 40 disposed within the formation range of the touch electrode 30 in the Y-axis direction is the main spacer 40α. The plurality of sub-spacers 40β include a first sub-spacer 40β1 overlapping any one of the plurality of touch electrodes 30, and a second sub-spacer 40β2 at least partially positioned between two touch electrodes 30 adjacent to each other in the Y-axis direction. Among the plurality of spacers 40 disposed within the formation range of the touch electrode 30 in the Y-axis direction, all spacers that are not the main spacers 40α are the first sub-spacers 40β1. The second sub-spacer 40β2 overlaps the first slit 25A1 partitioning two touch electrodes 30 adjacent to each other in the Y-axis direction. The second sub-spacer 40β2 overlaps a portion of the blocking portion 41 positioned between two touch electrodes 30 adjacent to each other in the Y-axis direction. Thus, at a position between two touch electrodes 30 adjacent to each other in the Y-axis direction, the second sub-spacer 40β2 is disposed, but the main spacer 40α is not disposed. The main spacer 40α does not overlap the blocking portion 41 disposed in the same layer as the first touch wiring line 31α, the first connection wiring line 32α, the second touch wiring line 31β, and the second connection wiring line 32β. Accordingly, the main spacer 40α coming into contact with a portion of the inner face of the array substrate 21 where unevenness caused by the blocking portion 41 occurs can be avoided. As a result, the contact area of the main spacer 40α having a larger protrusion dimension from the counter substrate 20 than that of the sub-spacer 40β with respect to the inner face of the array substrate 21 can be sufficiently ensured, thereby improving the uniformity of the cell gap.

As described above, the liquid crystal panel (display device) 10 of the present embodiment includes the array substrate 21, the counter substrate 20 facing the array substrate 21 with a gap therebetween, the first pixel electrode 24α provided to the array substrate 21, the second pixel electrode 24β provided to the array substrate 21 and spaced apart from the first pixel electrode 24α in the first direction, the third pixel electrode 24γ provided to the array substrate 21 and spaced apart from the second pixel electrode 24β in the first direction, the first touch wiring line 31α and the first connection wiring line 32α constituting the first wiring line, provided to the array substrate 21, positioned between the first pixel electrode 24α and the second pixel electrode 24β, and extending in the second direction intersecting the first direction, the second pixel electrode row 24βC provided to the array substrate 21, including the second pixel electrode 24β, and composed of the plurality of pixel electrodes 24 aligned in the second direction, the third pixel electrode row 24γC provided to the array substrate 21, including the third pixel electrode 24γ, and composed of the plurality of pixel electrodes 24 aligned in the second direction, the flattening film (first insulating film) 36 provided to the array substrate 21 and disposed on the lower-layer side of the first touch wiring line 31α and the first connection wiring line 32α constituting the first wiring line, and the spacer 40 provided to the counter substrate 20 and protruding from the counter substrate 20 toward the array substrate 21. The spacer 40 is positioned between the second pixel electrode row 24βC and the third pixel electrode row 24γC, and a portion of the flattening film 36 overlapping the spacer 40 is the higher portion 36A higher than a remaining portion.

The spacer 40 protruding from the counter substrate 20 toward the array substrate 21 can be in contact with a portion of the inner face of the array substrate 21 that overlaps the higher portion 36A of the flattening film 36. This ensures that the spacing (cell gap) between the array substrate 21 and the counter substrate 20 facing each other is well maintained. Here, given that the first touch wiring line 31α and the first connection wiring line 32α constituting the first wiring line are disposed on the lower-layer side of the flattening film 36 including the higher portion 36A, the occurrence of unevenness on the inner face of the array substrate 21 caused by the first touch wiring line 31α and the first connection wiring line 32α constituting the first wiring line can be avoided. On the other hand, in a configuration in which the first touch wiring line 31α and the first connection wiring line 32α constituting the first wiring line are disposed on the upper-layer side of the flattening film 36 including the higher portion 36A, unevenness on the inner face of the array substrate 21 caused by the first touch wiring line 31α and the first connection wiring line 32α constituting the first wiring line may occur. In this regard, the spacer 40 is positioned between the second pixel electrode row 24βC and the third pixel electrode row 24γC spaced apart from each other in the first direction, and thus the first touch wiring line 31α and the first connection wiring line 32α constituting the first wiring line and positioned between the first pixel electrode 24α and the second pixel electrode 24β spaced apart from each other in the first direction are in a non-overlapping relationship. This means that the higher portion 36A of the flattening film 36 overlapping the spacer 40 is in a non-overlapping relationship with the first touch wiring line 31α and the first connection wiring line 32α constituting the first wiring line. Accordingly, the occurrence of unevenness caused by the first touch wiring line 31α and the first connection wiring line 32α constituting the first wiring line is avoided in the portion of the inner face of the array substrate 21 overlapping the higher portion 36A. According to the above, regardless of the settings of the line widths of the first touch wiring line 31α and the first connection wiring line 32α constituting the first wiring line, the contact area of the spacer 40 with the inner face of the array substrate 21 can be stably and sufficiently ensured. Thus, the uniformity of the cell gap is improved.

Further, the spacer 40 is positioned between the second pixel electrode 24β and the third pixel electrode 24γ. Compared to a case in which the spacer 40 is positioned in the middle of two second pixel electrodes 24β (third pixel electrodes 24γ) adjacent to each other in the second direction, the spacing can be narrowed between two second pixel electrodes 24β (third pixel electrodes 24γ) adjacent to each other in the second direction.

Further, the array substrate 21 or the counter substrate 20 is provided with the first color filter 28G overlapping the first pixel electrode 24α, the second color filter 28B overlapping the second pixel electrode 24β, and the third color filter 28R overlapping the third pixel electrode 24γ, and the first color filter 28G is highest in relative luminous efficiency, the second color filter 28B is lowest in the relative luminous efficiency, and the third color filter 28R is lower in the relative luminous efficiency than the first color filter 28G and higher in the relative luminous efficiency than the second color filter 28B. In a case in which a display failure such as a bright spot defect in which light is constantly transmitted in the vicinity of the spacer 40 occurs, there is a tendency for the display at the pixel electrode 24 present in the vicinity of the spacer 40 to be adversely affected. In this regard, the spacer 40 is positioned between the second pixel electrode 24β (second pixel electrode row 24βC) overlapping the second color filter 28B, which is lowest in the relative luminous efficiency, and the third pixel electrode 24γ (third pixel electrode row 24γC) overlapping the third color filter 28R, which is lower in the relative luminous efficiency than the first color filter 28G, and thus, even if the display at the second pixel electrode 24β and the third pixel electrode 24γ is adversely affected, the effect on the overall display quality is minimal. In addition, the display at the first pixel electrode 24α overlapping the first color filter 28G, which is highest in the relative luminous efficiency, is unlikely to be adversely affected, and thus the overall display quality can be favorably maintained.

Further, the array substrate 21 is provided with the fourth pixel electrode 24δ spaced apart from the third pixel electrode 24γ on a side opposite to the second pixel electrode 24β in the first direction, the first color filter 28G overlaps the first pixel electrode 24α and the fourth pixel electrode 24δ, and the array substrate 21 is provided with the second touch wiring line 31β and the second connection wiring line 32β constituting the second wiring line, positioned between the third pixel electrode 24γ and the fourth pixel electrode 24δ, and extending in the second direction. Thus, the positioning of the spacer 40 between the fourth pixel electrode 24δ overlapping the first color filter 28G, which is highest in the relative luminous efficiency, and the third pixel electrode 24γ overlapping the third color filter 28R, which is lower in the relative luminous efficiency than the first color filter 28G, can be avoided. Accordingly, the display at the first pixel electrode 24α and the fourth pixel electrode 24δ overlapping the first color filter 28G, which is highest in the relative luminous efficiency, is less likely to be adversely affected by the spacer 40.

Further, the array substrate 21 is provided with the second interlayer insulating film (second insulating film) 37 disposed on the upper-layer side of the first touch wiring line 31α and the first connection wiring line 32α constituting the first wiring line, and the touch electrode (position detection electrode) 30 disposed on the upper-layer side of the second interlayer insulating film 37, and the first wiring line includes the first touch wiring line 31α connected to any one of the plurality of touch electrodes 30. The signal transmitted to the first touch wiring line 31α included in the first wiring line is supplied to the touch electrode 30. With the touch electrode 30 being positioned on the upper-layer side of the first touch wiring line 31α and the first connection wiring line 32α constituting the first wiring line with the second interlayer insulating film 37 interposed therebetween, the position detection sensitivity is favorable. The first touch wiring line 31α included in the first wiring line is in a non-overlapping relationship with the spacer 40 and the higher portion 36A, and thus stresses caused by the spacer 40 coming into contact with the inner face of the array substrate 21 are less likely to adversely affect the connection locations between the first touch wiring line 31α and the touch electrode 30. Thus, a connection reliability between the first touch wiring line 31α and the touch electrode 30 is favorable.

Further, the array substrate 21 is provided with the gate wiring line (third wiring line) 26 disposed on the lower-layer side of the flattening film 36, and the blocking portion 41 disposed in the same layer as the first touch wiring line 31α and the first connection wiring line 32α constituting the first wiring line. A plurality of the first pixel electrodes 24α, a plurality of the second pixel electrodes 24β, and a plurality of the third pixel electrodes 24γ are disposed side by side spaced apart in the second direction. The plurality of touch electrodes 30 are disposed side by side spaced apart in the second direction, and the boundary between two touch electrodes 30 adjacent to each other in the second direction is aligned with the boundaries between two first pixel electrodes 24α, two second pixel electrodes 24β, and two third pixel electrodes 24γ respectively adjacent to each other in the second direction. The gate wiring line 26 extends in the first direction and is positioned between two touch electrodes 30 adjacent to each other in the second direction, and the blocking portion 41 overlaps at least a portion of the gate wiring line 26 and is directly or indirectly connected to any one of the plurality of touch electrodes 30. Thus, the blocking portion 41 directly or indirectly connected to any one of the plurality of touch electrodes 30 overlaps at least a portion of the gate wiring line 26, thereby blocking an electric field generated from the gate wiring line 26. Moreover, the blocking portion 41 is at the same potential as the touch electrode 30 being connected, and thus a pixel capacitance of two first pixel electrodes 24α, two second pixel electrode 24β, and two third pixel electrode 24γ adjacent to each other in the second direction with the boundary aligned with the boundary of two touch electrodes 30 adjacent to each other in the second direction interposed therebetween can be made equal to the pixel capacitance of the other first pixel electrodes 24α, second pixel electrodes 24β, and third pixel electrodes 24γ. As a result, the display quality can be improved.

Further, the spacer 40 includes the main spacer 40α, and the plurality of sub-spacers 40β each having a protrusion dimension from the counter substrate 20 smaller than that of the main spacer 40α. The main spacer 40α overlaps any one of the plurality of touch electrodes 30. The plurality of sub-spacers 40β include the first sub-spacer 40β1 overlapping any one of the plurality of touch electrodes 30, and the second sub-spacer 40β2 at least partially positioned between two of the touch electrodes 30 adjacent to each other in the second direction, and overlapping a portion of the blocking portion 41. By the main spacer 40α and the plurality of sub-spacers 40β (including the first sub-spacer 40β1 and the second sub-spacer 40β2), the cell gap is favorably maintained. At a position between two touch electrodes 30 adjacent to each other in the second direction, the second sub-spacer 40β2 is disposed, but the main spacer 40α is not disposed. Accordingly, the main spacer 40α does not overlap the blocking portion 41 disposed in the same layer as the first touch wiring line 31α and the first connection wiring line 32α constituting the first wiring line, and thus the main spacer 40α coming into contact with a portion of the inner face of the array substrate 21 where unevenness caused by the blocking portion 41 occurs can be avoided. As a result, the contact area of the main spacer 40α having a larger protrusion dimension from the counter substrate 20 than that of the sub-spacer 40β with respect to the inner face of the array substrate 21 can be sufficiently ensured, thereby improving the uniformity of the cell gap.

Further, the array substrate 21 is provided with the fourth pixel electrode 24δ spaced apart from the third pixel electrode 24γ on a side opposite to the second pixel electrode 24β in the first direction, and the second touch wiring line (second position detection wiring line) 31β positioned between the third pixel electrode 24γ and the fourth pixel electrode 24δ and extending in the second direction. The array substrate 21 or the counter substrate 20 is provided with the first color filter 28G overlapping the first pixel electrode 24α and the fourth pixel electrode 24δ, the second color filter 28B overlapping the second pixel electrode 24β, and the third color filter 28R overlapping the third pixel electrode 24γ. The first color filter 28G is highest in relative luminous efficiency, the second color filter 28B is lowest in the relative luminous efficiency, and the third color filter 28R is lower in the relative luminous efficiency than the first color filter 28G and higher in the relative luminous efficiency than the second color filter 28B. The blocking portion 41 includes the first blocking portion 41α coupled to the first touch wiring line 31α, the second blocking portion 41β coupled to the second touch wiring line 31β, and the third blocking portion 41γ separated from the first touch wiring line 31α, the second touch wiring line 31β, the first blocking portion 41α, and the second blocking portion 41β. The third blocking portion 41γ is disposed between the first blocking portion 41α and the second blocking portion 41β in the first direction. The third blocking portion 41γ positioned between the first blocking portion 41α coupled to the first touch wiring line 31α and the second blocking portion 41β coupled to the second touch wiring line 31β is separated from the first touch wiring line 31α, the second touch wiring line 31β, and the like and is isolated in an island shape. If the third blocking portion 41γ is coupled to the first touch wiring line 31α or the second touch wiring line 31β, a load difference occurs between the first touch wiring line 31α and the second touch wiring line 31β. In this regard, by isolating the third blocking portion 41γ in an island shape as described above, the load of the first touch wiring line 31α and the load of the second touch wiring line 31β can be equalized. As a result, variation in the position detection sensitivity is less likely to occur.

Further, a plurality of the first pixel electrodes 24α, a plurality of the second pixel electrodes 24β, a plurality of the third pixel electrodes 24γ, a plurality of the first touch wiring lines 31α and the first connection wiring lines 32α constituting the first wiring line, a plurality of the spacers 40, and a plurality of the higher portions 36A are provided, the plurality of first wiring lines include the first connection wiring line 32α connected to any one of the plurality of touch electrodes 30 at a plurality of locations, and the first connection wiring line 32α is disposed side by side and spaced apart in the second direction with respect to the first touch wiring line 31α. The resistance distribution of the touch electrode 30 connected to the first connection wiring line 32α can be reduced. As a result, the position detection sensitivity is favorable. The first connection wiring line 32α included in the first wiring line is in a non-overlapping relationship with the spacer 40 and the higher portion 36A, and thus stresses caused by the spacer 40 coming into contact with the inner face of the array substrate 21 are less likely to adversely affect the connection locations between the first connection wiring line 32α and the touch electrode 30. Thus, the connection reliability between the first connection wiring line 32α and the touch electrode 30 is favorable.

Further, a plurality of the first pixel electrodes 24α, a plurality of the second pixel electrodes 24β, and a plurality of the third pixel electrodes 24γ are disposed side by side spaced apart in the second direction, and a plurality of the spacers 40 and a plurality of the higher portions 36A are disposed side by side spaced apart in the second direction. In this way, the plurality of spacers 40 and the plurality of higher portions 36A aligned side by side spaced apart in the second direction are in a non-overlapping relationship with the first touch wiring lines 31α and the first connection wiring lines 32α constituting the first wiring line extending in the second direction. The occurrence of unevenness caused by the first touch wiring line 31α and the first connection wiring line 32α constituting the first wiring line can be avoided in the portions of the inner face of the array substrate 21 overlapping the plurality of higher portions 36A, and thus contact areas of the plurality of spacers 40 with the inner face of the array substrate 21 can be stably and sufficiently ensured. As a result, the uniformity of the cell gap is further improved.

Second Embodiment

A second embodiment will now be described with reference to FIG. 15 or FIG. 16. In this second embodiment, a case in which an arrangement of a spacer 140 and a higher portion 136A is changed will be described. Further, repetitive descriptions of structures, actions, and effects similar to those of the first embodiment described above will be omitted.

Figure 15:
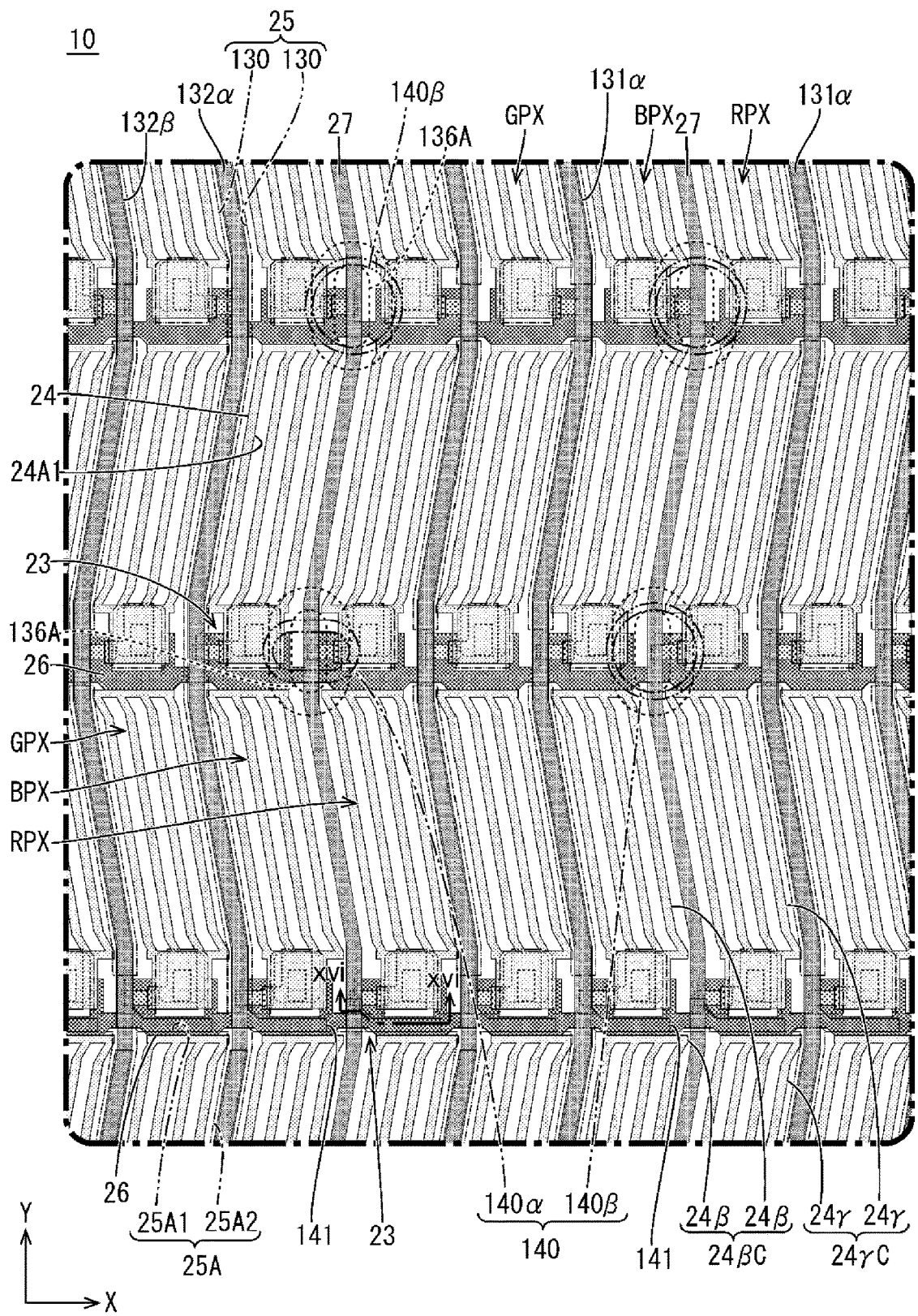
FIG. 15 is a plan view illustrating a pixel arrangement in the display region of the liquid crystal panel according to a second embodiment, and illustrates the third metal film with shading.
Figure 16:
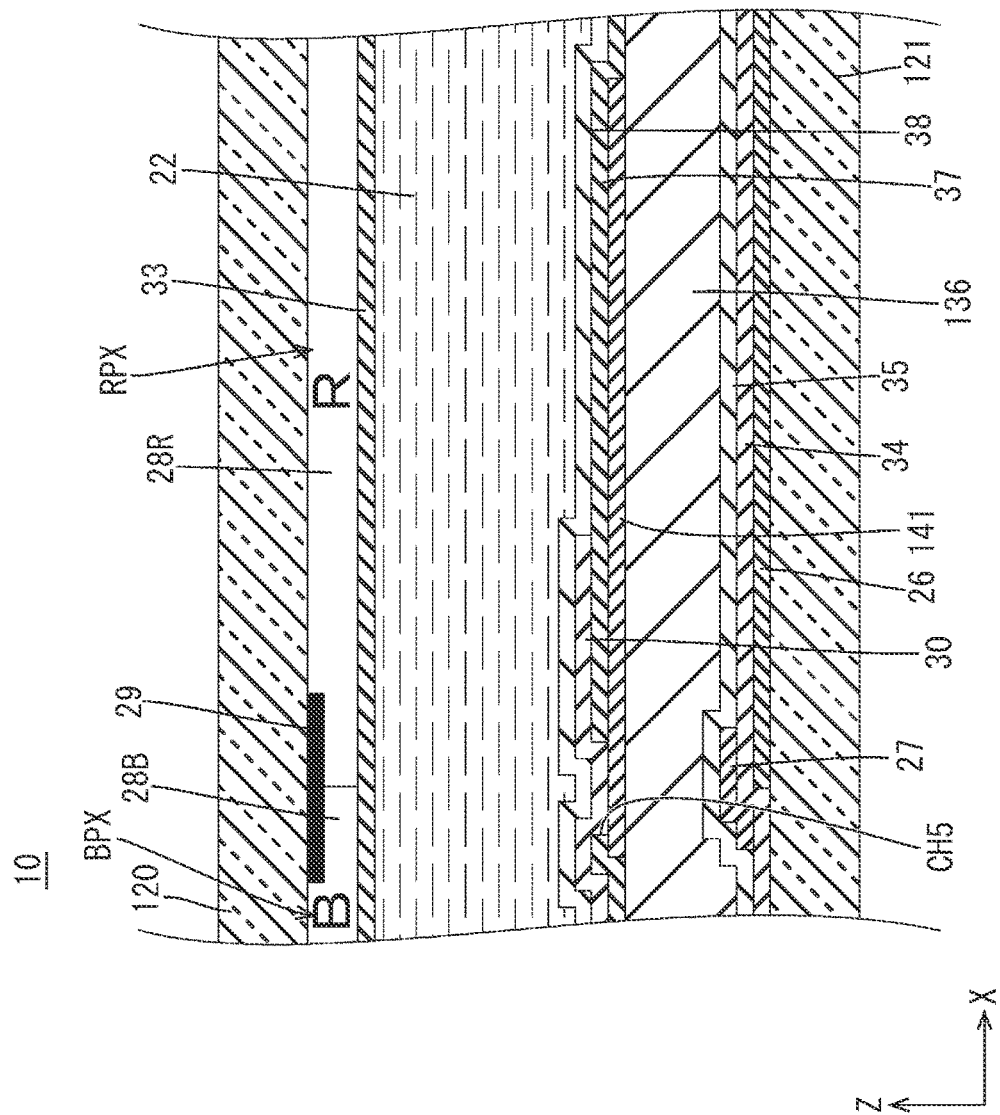
FIG. 16 is a cross-sectional view of the liquid crystal panel taken along line xvi-xvi in FIG. 15.

As illustrated in FIG. 15, each of the spacers 140 according to the present embodiment overlaps a touch electrode 130. Specifically, each of a main spacer 140α and a sub-spacer 140β overlaps any one of a plurality of the touch electrodes 130. In the present embodiment, all sub-spacers 140β can be described as the first sub-spacers 40β1 described in the first embodiment described above. Accordingly, as illustrated in FIG. 16, all of the spacers 140α, 140β are in a non-overlapping relationship with a blocking portion 141 positioned between two touch electrodes 130 adjacent to each other in the Y-axis direction. The main spacer 140α and the sub-spacer 140β do not overlap the blocking portion 141 disposed in the same layer as a first touch wiring line 131α, a first connection wiring line 132α, a second touch wiring line 131β, and a second connection wiring line 132β. Accordingly, the main spacer 140α and the sub-spacer 140β coming into contact with a portion of an inner face of an array substrate 121 where unevenness caused by the blocking portion 141 occurs can be avoided. As a result, contact areas of the main spacer 140α and the sub-spacer 140β with the inner face of the array substrate 121 can be sufficiently ensured, and thus the uniformity of the cell gap is improved.

As described above, according to the present embodiment, the spacer 140 includes the main spacer 140α, and the sub-spacer 140β having a protrusion dimension from the counter substrate 120 smaller than that of the main spacer 140α, and the main spacer 140α and the sub-spacer 140β each overlap any one of the plurality of touch electrodes 130 and do not overlap the blocking portion 141. By the main spacer 140α and the sub-spacer 140β, a favorable cell gap is maintained. The main spacer 140α and the sub-spacer 140β do not overlap the blocking portion 141 disposed in the same layer as the first touch wiring line 131α and the first connection wiring line 132α constituting the first wiring line, and thus the main spacer 140α and the sub-spacer 140β coming into contact with a portion of the inner face of the array substrate 121 where unevenness caused by the blocking portion 141 occurs can be avoided. As a result, contact areas of the main spacer 140α and the sub-spacer 140β with the inner face of the array substrate 121 can be sufficiently ensured, and thus the uniformity of the cell gap is improved.

Third Embodiment

A third embodiment will now be described with reference to FIG. 17. This third embodiment illustrates a case in which a configuration of a blocking portion 241 is changed from that of the first embodiment described above. Further, repetitive descriptions of structures, actions, and effects similar to those of the first embodiment described above will be omitted.

Figure 17:
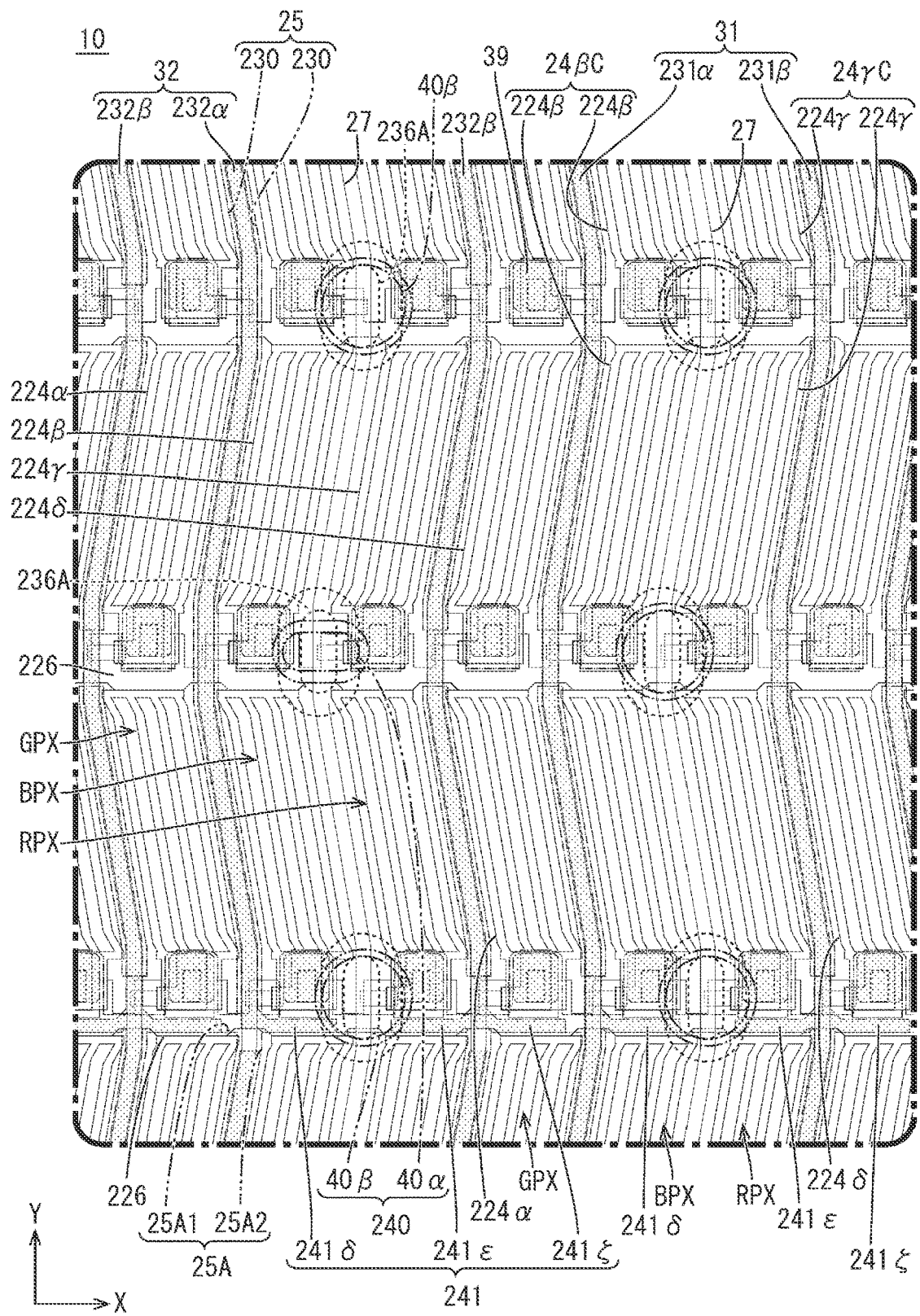
FIG. 17 is a plan view illustrating a pixel arrangement in the display region of the liquid crystal panel according to a third embodiment, and illustrates the third metal film with shading.

As illustrated in FIG. 17, the blocking portion 241 according to the present embodiment includes a fourth blocking portion 241δ coupled to one of a first touch wiring line 231α and a first connection wiring line 232α, a fifth blocking portion 241ε coupled to one of a second touch wiring line 231β and a second connection wiring line 232β, and a sixth blocking portion 241ζ coupled to one of the second touch wiring line 231β and the second connection wiring line 232β. Note that, when the blocking portions 241 are distinguished from each other, a suffix "δ" is appended to the reference numeral of the fourth blocking portion, a suffix "ε" is appended to the reference numeral of the fifth blocking portion, and a suffix "ζ" is appended to the reference numeral of the sixth blocking portion, and when the blocking portions 241 are collectively referred to without distinction, a suffix is not appended to the reference numeral. That is, in the present embodiment, all blocking portions 241 are coupled to one of the touch wiring line 231 and the connection wiring line 232.

Specifically, the fourth blocking portion 241δ is coupled to a location where one of the first touch wiring line 231α and the first connection wiring line 232α intersects a gate wiring line 226. The fourth blocking portion 241δ has the same potential as the touch electrode 230 connected to one of the first touch wiring line 231α and the first connection wiring line 232α. The fourth blocking portion 241δ is positioned between two second pixel electrodes 224β adjacent to each other in the Y-axis direction. The fifth blocking portion 241ε and the sixth blocking portion 241ζ are each coupled to a location where one of the second touch wiring line 231β and the second connection wiring line 232β intersects the gate wiring line 226. The fifth blocking portion 241ε and the sixth blocking portion 241ζ have the same potential as the touch electrode 230 connected to one of the second touch wiring line 231β and the second connection wiring line 232β. The fifth blocking portion 241ε extends from one of the second touch wiring line 231β and the second connection wiring line 232β toward the left side (fourth blocking portion 241δ side) of FIG. 17. The fifth blocking portion 241ε is positioned between two third pixel electrodes 224γ adjacent to each other in the Y-axis direction. The sixth blocking portion 241 ζ extends from one of the second touch wiring line 231β and the second connection wiring line 232β toward the right side of FIG. 17, that is, a side opposite to the fifth blocking portion 241ε. The sixth blocking portion 241 ζ is positioned between two first pixel electrodes 224α (fourth pixel electrodes 224δ) adjacent to each other in the Y-axis direction.

The fourth blocking portion 241δ and the fifth blocking portion 241ε are disposed with a higher portion 236A interposed therebetween in the X-axis direction. According to such a configuration, a spacer 240 overlapping the higher portion 236A comes into contact with a portion of the inner face of the array substrate 21 between the fourth blocking portion 241δ and the fifth blocking portion 241ε. In the portion of the inner face of the array substrate 21 between the fourth blocking portion 241δ and the fifth blocking portion 241ε, unevenness caused by the fourth blocking portion 241δ and the fifth blocking portion 241ε is less likely to occur. Thus, the contact area of the spacer 240 with the inner face of the array substrate 21 can be sufficiently ensured.

As described, according to the present embodiment, the array substrate 21 is provided with the plurality of fourth pixel electrodes 2246 spaced apart from the plurality of third pixel electrodes 224γ on a side opposite to the second pixel electrode 224β in the first direction, and the second touch wiring line 231β positioned between the third pixel electrode 224γ and the fourth pixel electrode 2246 and extending in the second direction. The array substrate 21 or the counter substrate 220 is provided with the first color filter 28G overlapping the first pixel electrode 224α and the fourth pixel electrode 224δ, the second color filter 28B overlapping the second pixel electrode 224β, and the third color filter 28R overlapping the third pixel electrode 224γ. The first color filter 28G is highest in the relative luminous efficiency, the second color filter 28B is lowest in the relative luminous efficiency, the third color filter 28R is lower in the relative luminous efficiency than the first color filter 28G and higher in the relative luminous efficiency than the second color filter 28B. The blocking portion 241 includes the fourth blocking portion 241γ coupled to the first touch wiring line 231α, and the fifth blocking portion 241ε coupled to the second touch wiring line 231β. The fourth blocking portion 241γ and the fifth blocking portion 241ε are disposed with the higher portion 236A interposed therebetween. With the higher portion 236A being interposed between the fourth blocking portion 241δ coupled to the first touch wiring line 231α and the fifth blocking portion 241ε coupled to the second touch wiring line 231β, the spacer 240 overlapping the higher portion 236A comes into contact with a portion of the inner face of the array substrate 21 between the fourth blocking portion 241δ and the fifth blocking portion 241ε. In the portion of the inner face of the array substrate 21 between the fourth blocking portion 241δ and the fifth blocking portion 241ε, unevenness caused by the fourth blocking portion 241δ and the fifth blocking portion 241ε is less likely to occur. Thus, the contact area of the spacer 240 with the inner face of the array substrate 21 can be sufficiently ensured.

Fourth Embodiment

A fourth embodiment will now be described with reference to FIG. 18. In this fourth embodiment, a case in which the arrangement of a blocking portion 341 is changed from that in the third embodiment described above will be described. Note that redundant descriptions of structures, actions, and effects similar to those of the third embodiment described above will be omitted.

Figure 18:
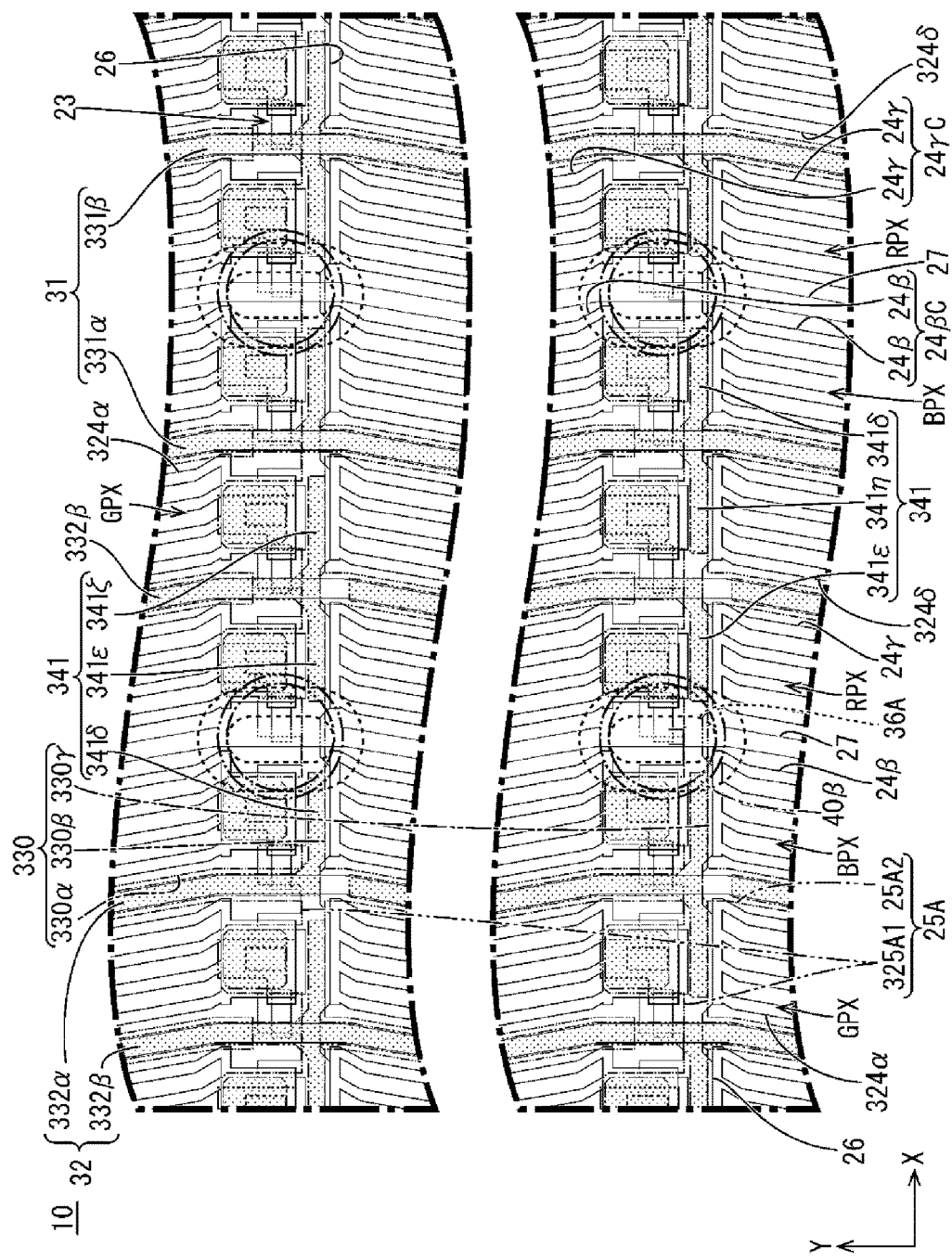
FIG. 18 is a plan view illustrating a pixel arrangement in the display region of the liquid crystal panel according to a fourth embodiment, and illustrates the third metal film with shading.

First, as illustrated in FIG. 18, a plurality of touch electrodes 330 aligned in the Y-axis direction include a first touch electrode 330α, a second touch electrode 330β spaced apart from the first touch electrode 330α in the Y-axis direction, and a third touch electrode 330γ spaced apart from the second touch electrode 330β in the Y-axis direction. Note that, when the touch electrodes 330 are distinguished from each other, a suffix "α" is appended to the reference numeral of the first touch electrode, a suffix "β" is appended to the reference numeral of the second touch electrode, and a suffix "γ" is appended to the reference numeral of the third touch electrode, and when the touch electrodes 330 are collectively referred to without distinction, a suffix is not appended to the reference numeral.

The blocking portion 341 according to the present embodiment includes a fourth blocking portion 341δ, a fifth blocking portion 341ε, a sixth blocking portion 341ζ and a seventh blocking portion 341η. Note that, when the blocking portions 341 are distinguished from each other, a suffix "δ" is appended to the reference numeral of the fourth blocking portion, a suffix "ε" is appended to the reference numeral of the fifth blocking portion, a suffix "ζ" is appended to the reference numeral of the sixth blocking portion, and suffix "η" is appended to the reference numeral of the seventh blocking portion, and when the blocking portions 341 are collectively referred to without distinction, a suffix is not appended to the reference numeral. Basic configurations of the fourth blocking portion 341δ, the fifth blocking portion 341ε, and the sixth blocking portion 341ζ are as described in the third embodiment.

Each of the fourth blocking portion 341δ and the fifth blocking portion 341ε is positioned between two touch electrodes 330 adjacent to each other in the Y-axis direction. Specifically, the fourth blocking portion 341δ and the fifth blocking portion 341ε are disposed between the first touch electrode 330α and the second touch electrode 330β and between the second touch electrode 330β and the third touch electrode 330γ, respectively. A number of installations of each of the fourth blocking portion 341δ and the fifth blocking portion 341ε is a value obtained by subtracting one from the number of the touch electrodes 330 aligned in the Y-axis direction, and coincides with a number of first slits 325A1.

The sixth blocking portion 341ζ is coupled to one of a second touch wiring line 331β and a second connection wiring line 332β. The sixth blocking portion 341 extends from one of the second touch wiring line 331β and the second connection wiring line 332β toward the right side of FIG. 18, that is, toward a side opposite to the fifth blocking portion 341ε. The sixth blocking portion 341ζ is positioned between two first pixel electrodes 324α (fourth pixel electrodes 324δ) adjacent to each other in the Y-axis direction. The sixth blocking portion 341ζ is disposed between the first touch electrode 330α and the second touch electrode 330β, but is not disposed between the second touch electrode 330β and the third touch electrode 330γ. The seventh blocking portion 341111 is coupled to one of a first touch wiring line 331α and a first connection wiring line 332α. The seventh blocking portion 341η extends from one of the first touch wiring line 331α and the first connection wiring line 332α toward the left side of FIG. 18, that is, toward a side opposite to the fourth blocking portion 341δ. The seventh blocking portion 341η is positioned between two first pixel electrodes 324α (fourth pixel electrodes 324δ) adjacent to each other in the Y-axis direction. The seventh blocking portion 341η is disposed between the second touch electrode 330β and the third touch electrode 330γ, but is not disposed between the first touch electrode 330α and the second touch electrode 330β. Thus, the sixth blocking portion 341 and the seventh blocking portion 341η are alternately disposed with respect to a plurality of the first slits 325A1 that partition the plurality of touch electrodes 330 aligned in the Y-axis direction. Specifically, the sixth blocking portion 341 is disposed in odd-numbered first slits 325A1 among the plurality of first slits 325A1, and the seventh blocking portion 341η is disposed in even-numbered first slits 325A1 among the plurality of first slits 325A1.

According to the above-described configuration, a predetermined number of seventh blocking portions 341η and a number of fourth blocking portions 341δ equivalent to twice that of the seventh blocking portions 341η are coupled to the first touch wiring line 331α and the first connection wiring line 332α, respectively. A predetermined number of sixth blocking portions 341ζ and a number of fifth blocking portions 341ε equivalent to twice that of the sixth blocking portions 341ζ are coupled to the second touch wiring line 331β and the second connection wiring line 332β, respectively. With the number of blocking portions 341 coupled at the first touch wiring line 331α and the number of blocking portions 341 coupled at the second touch wiring line 331β being the same, the load on the first touch wiring line 331α and the second touch wiring line 331β can be equalized. With the number of blocking portions 341 coupled at the first connection wiring line 332α and the number of blocking portions 341 coupled at the second connection wiring line 332β being the same, the load on the first connection wiring line 332α and the second connection wiring line 332β can be equalized. As a result, variation in the position detection sensitivity is less likely to occur.

As described above, according to the present embodiment, the plurality of touch electrodes 330 include the first touch electrode 330α, the second touch electrode 330β spaced apart from the first touch electrode 330α in the second direction, and the third touch electrode 330γ spaced apart from the second touch electrode 330β in the second direction. The fourth blocking portion 341δ and the fifth blocking portion 341ε are positioned between the first touch electrode 330α and the second touch electrode 330β and between the second touch electrode 330β and the third touch electrode 330γ, respectively. The blocking portion 341 includes the sixth blocking portion 341ζ coupled to the second touch wiring line 341β, and the seventh blocking portion 341η coupled to the first touch wiring line 331α. The sixth blocking portion 341ζ is disposed on a side opposite to the fifth blocking portion 341ε in the first direction with the second touch wiring line 331β interposed therebetween, and the seventh blocking portion 341η is disposed on a side opposite to the fourth blocking portion 341δ in the first direction with the first touch wiring line 331α interposed therebetween. Two fourth blocking portions 341δ and one seventh blocking portion 341η are coupled to the first touch wiring line 331α. Two fifth blocking portions 341ε and one sixth blocking portion 341ζ are coupled to the second touch wiring line 331β. With the number of blocking portions 341 coupled at the first touch wiring line 331α and the number of blocking portions 341 coupled at the second touch wiring line 331β being the same, the load on the first touch wiring line 331α and the second touch wiring line 331β can be equalized. As a result, variation in the position detection sensitivity is less likely to occur.

Fifth Embodiment

A fifth embodiment will be described with reference to FIG. 19 or FIG. 20. This fifth embodiment describes a case in which a dummy wiring line 42 is added to the configuration described in the first embodiment described above. Further, repetitive descriptions of structures, actions, and effects similar to those of the first embodiment described above will be omitted.

Figure 19:
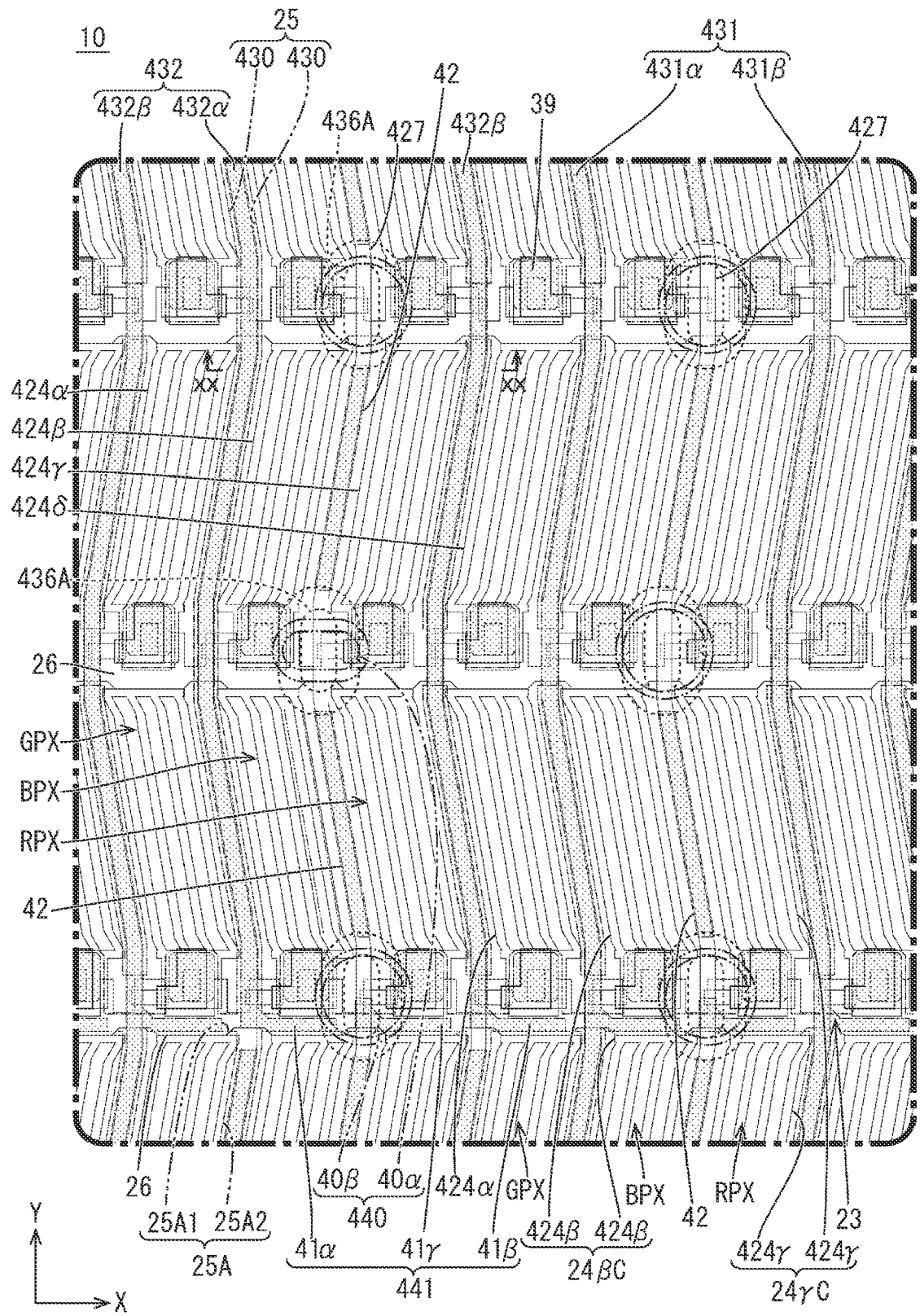
FIG. 19 is a plan view illustrating a pixel arrangement in the display region of the liquid crystal panel according to a fifth embodiment, and illustrates the third metal film with shading.
Figure 20:
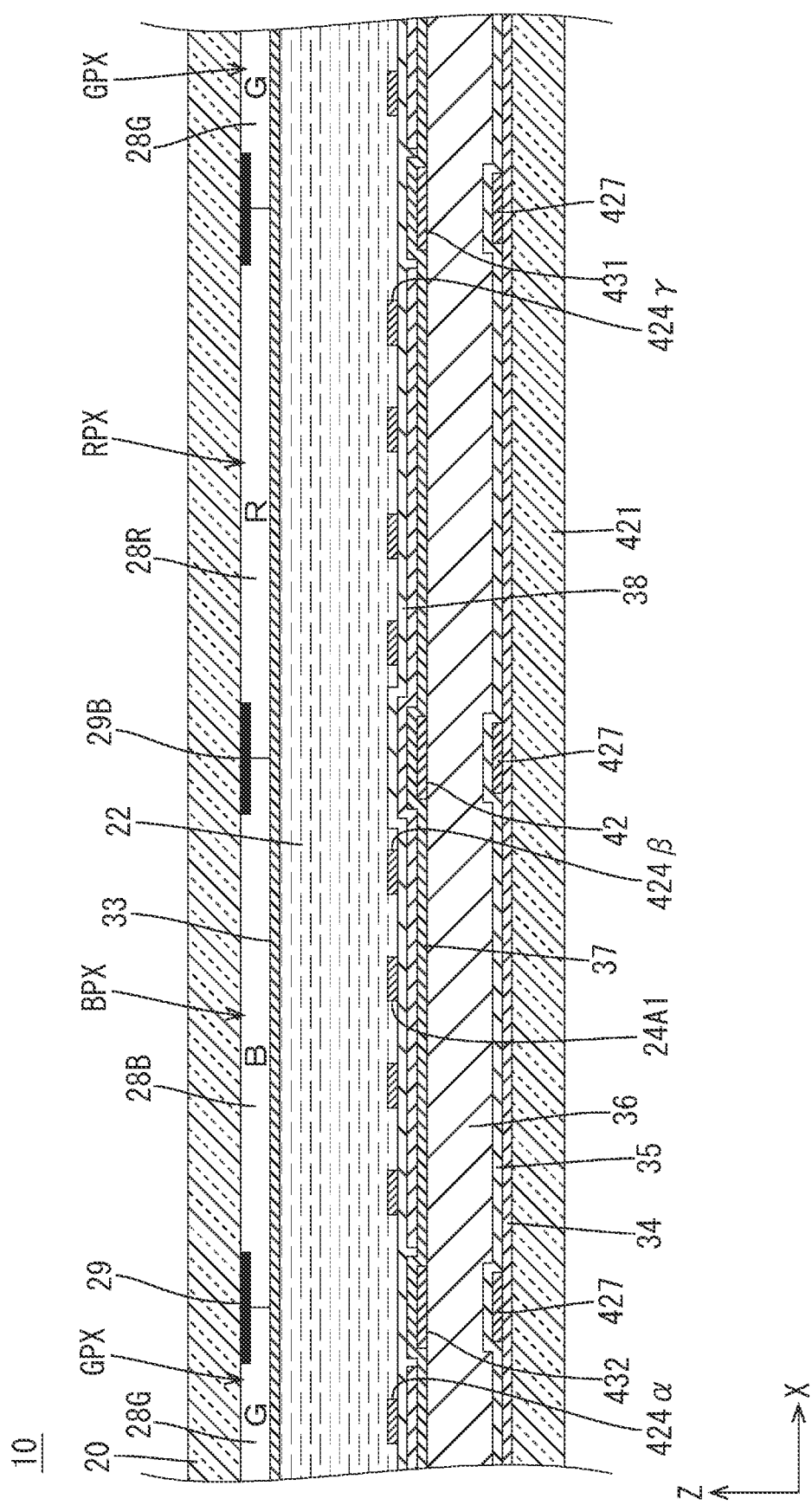
FIG. 20 is a cross-sectional view of the liquid crystal panel taken along line xx-xx in FIG. 19.

As illustrated in FIG. 19 and FIG. 20, an array substrate 421 according to the present embodiment is provided with the dummy wiring line 42 that overlaps, among a plurality of source wiring lines 427, the source wiring lines 427 not overlapped by a touch wiring line 431 and a connection wiring line 432. The dummy wiring line 42 is disposed in the same layer as the touch wiring line 431 and the connection wiring line 432 and is composed of the third metal film. A line width of the dummy wiring line 42 is equivalent to a line width of the source wiring line 427, the touch wiring line 431, and the connection wiring line 432. The dummy wiring line 42 extends substantially in the Y-axis direction similarly to the source wiring line 427 being overlapped. The dummy wiring line 42 is positioned between a second pixel electrode 424β and a third pixel electrode 424γ in the X-axis direction. The dummy wiring line 42 is positioned between two higher portions 436A adjacent to each other in the Y-axis direction. Accordingly, a length of the dummy wiring line 42 is shorter than a long-side dimension of the pixel electrode 424. The dummy wiring lines 42 are disposed side by side spaced apart in the Y-axis direction. The higher portion 436A is positioned between two dummy wiring lines 42 adjacent to each other in the Y-axis direction. The dummy wiring line 42 is not connected to any of a touch electrode 430, the touch wiring line 431, the connection wiring line 432, and a blocking portion 441, and is isolated in an island shape.

Unevenness caused by a first touch wiring line 431α, a first connection wiring line 432α, a second touch wiring line 431β, and a second connection wiring line 432β occurs at a position of an inner face of the array substrate 421 between a first pixel electrode 424α and the second pixel electrode 424β in the X-axis direction. In addition, unevenness caused by the dummy wiring line 42 occurs at a position of the inner face of the array substrate 421 between the second pixel electrode 424β and the third pixel electrode 424γ in the X-axis direction, and at a position between two higher portions 436A adjacent to each other in the Y-axis direction. That is, unevenness caused by any one of the touch wiring line 431, the connection wiring line 432, and the dummy wiring line 42 occurs at all positions of the inner face of the array substrate 421 overlapping the source wiring line 427. Accordingly, compared to a case in which the dummy wiring line 42 is not formed, position-based irregularities are less likely to occur in the shape of the inner face of the array substrate 421. As a result, the display quality is favorable. Further, a spacer 440 overlapping the higher portion 436A comes into contact with a portion of the inner face of the array substrate 421 between two dummy wiring lines 42 adjacent to each other in the Y-axis direction. In the portion of the inner face of the array substrate 421 between two dummy wiring lines 42 adjacent to each other in the Y-axis direction, unevenness caused by the dummy wiring line 42 is less likely to occur. Thus, a contact area of the spacer 440 with the inner face of the array substrate 421 can be sufficiently ensured.

As described above, according to the present embodiment, the array substrate 421 is provided with the dummy wiring line 42 positioned between the second pixel electrode 424β and the third pixel electrode 424γ, positioned between two of the higher portions 436A adjacent to each other in the second direction, disposed in the same layer as the first touch wiring line 431α and the first connection wiring line 432α constituting the first wiring line, and extending in the second direction. Unevenness caused by the first touch wiring line 431α and the first connection wiring line 432α constituting the first wiring line occurs at a position of the inner face of the array substrate 421 between the first pixel electrode 424α and the second pixel electrode 424β, and unevenness caused by the dummy wiring line 42 occurs at a position between the second pixel electrode 424β and the third pixel electrode 424γ and at a position between two higher portions 436A adjacent to each other in the second direction. Compared to a case in which the dummy wiring line 42 is not formed, position-based irregularities are less likely to occur in the shape of the inner face of the array substrate 421. As a result, the display quality is favorable.

Sixth Embodiment

A sixth embodiment will now be described with reference to FIG. 21 or FIG. 22. In the sixth embodiment, a dummy wiring line 542 changed from that in the fifth embodiment described above will be described. Further, repetitive descriptions of structures, actions, and effects similar to those of the first embodiment described above will be omitted.

Figure 21:
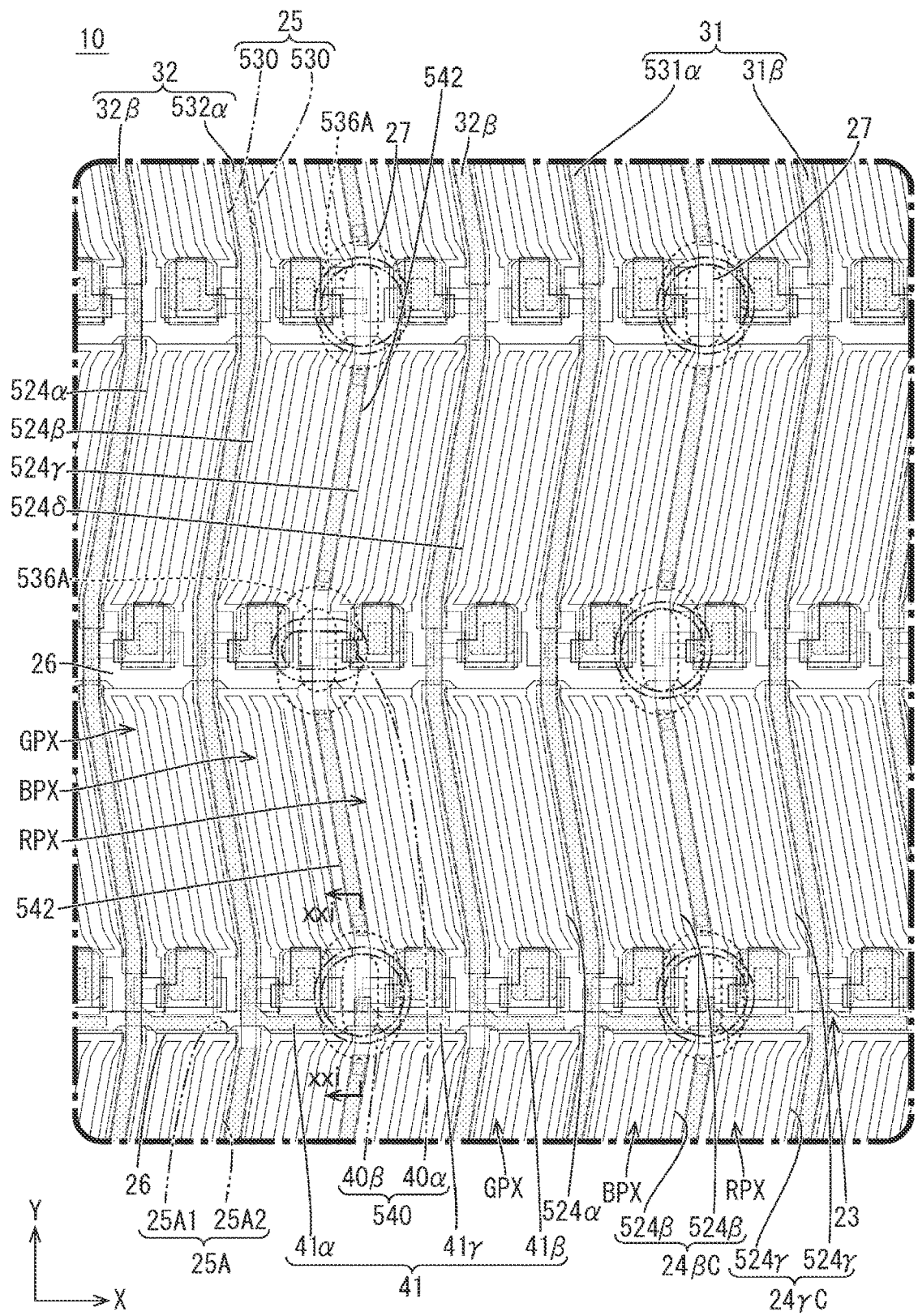
FIG. 21 is a plan view illustrating a pixel arrangement in the display region of the liquid crystal panel according to a sixth embodiment, and illustrates the third metal film with shading.
Figure 22:
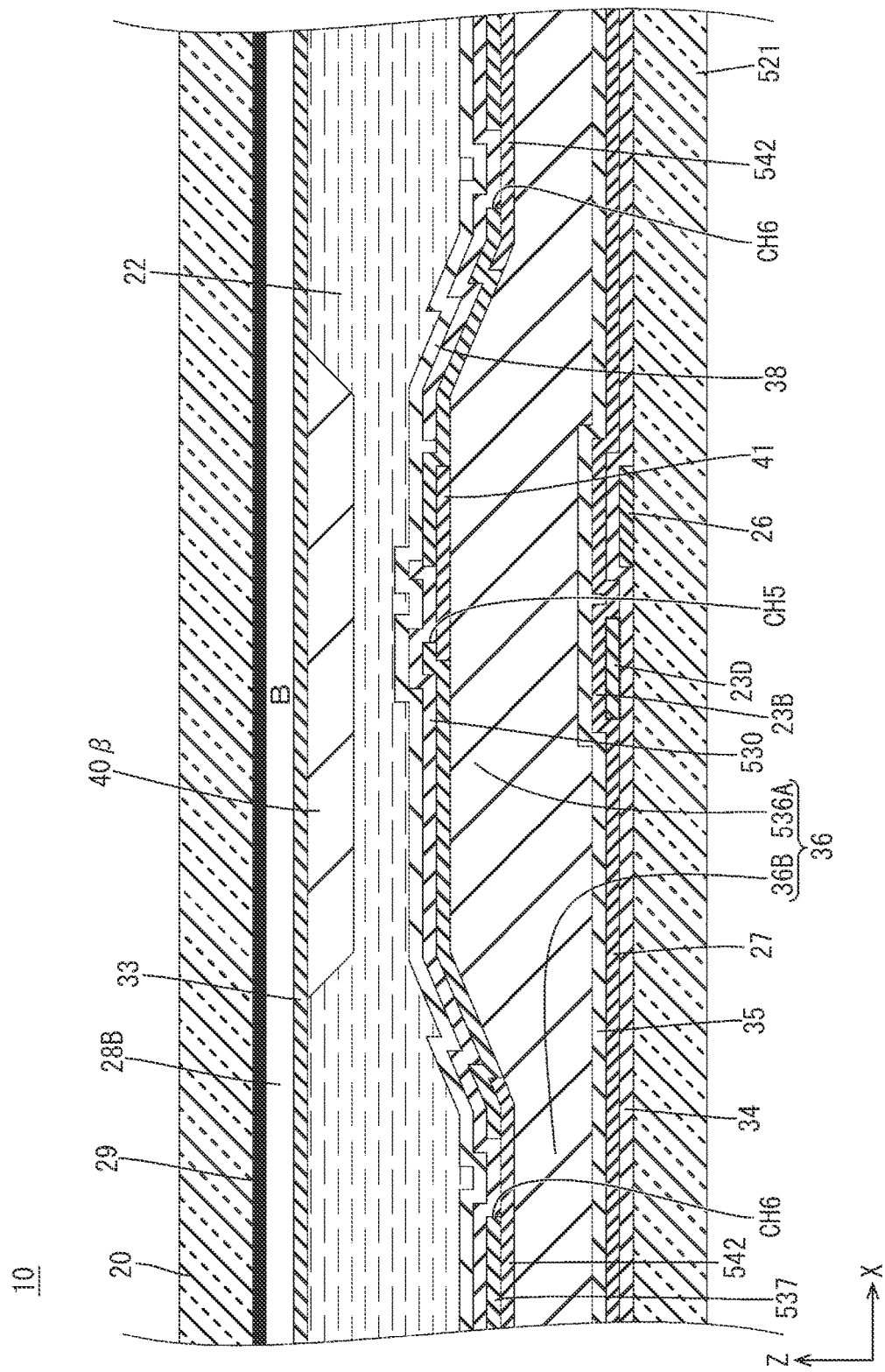
FIG. 22 is a cross-sectional view of the liquid crystal panel taken along line xxii-xxii in FIG. 21.

As illustrated in FIG. 21 and FIG. 22, the dummy wiring line 542 according to the present embodiment is connected to a touch electrode 530. Specifically, in a second interlayer insulating film 537 interposed between the dummy wiring line 542 and the touch electrode 530 overlapping each other, a sixth contact hole CH6 is formed at a position overlapping an end portion of the dummy wiring line 542. The dummy wiring line 542 is connected to the overlapping touch electrode 530 through the sixth contact hole CH6. In this way, the dummy wiring line 542 has the same potential as the touch electrode 530 connected thereto. Accordingly, a pixel capacitance of a first pixel electrode 524α and a second pixel electrode 524β sandwiching one of a first touch wiring line 531α and a first connection wiring line 532α therebetween can be made equal to a pixel capacitance of the second pixel electrode 524β and a third pixel electrode 524γ sandwiching the dummy wiring line 542 therebetween. As a result, the display quality can be improved.

As described above, according to the present embodiment, the array substrate 521 is provided with the second interlayer insulating film 537 disposed on an upper-layer side of the first touch wiring line 531α and the first connection wiring line 532α constituting the first wiring line, and the touch electrode 530 disposed on an upper-layer side of the second interlayer insulating film 537. The first wiring line includes the first touch wiring line 531α connected to any one of the plurality of position touch electrodes 530, and the dummy wiring line 542 is connected to any one of the plurality of touch electrodes 530. The signal transmitted to the first touch wiring line 531α included in the first wiring line is supplied to the touch electrode 530. With the touch electrode 530 being positioned on the upper-layer side of the first touch wiring line 531α and the first connection wiring line 532α constituting the first wiring line with the second interlayer insulating film 537 interposed therebetween, the position detection sensitivity is favorable. The first touch wiring line 531α included in the first wiring line is in a non-overlapping relationship with a spacer 540 and a higher portion 536A, and thus stresses caused by the spacer 540 coming into contact with the inner face of an array substrate 521 are less likely to adversely affect the connection locations between the first touch wiring line 531α and the touch electrode 530. Thus, the connection reliability between the first touch wiring line 531α and the touch electrode 530 is favorable. In addition, the dummy wiring line 542 is connected to any one of the plurality of touch electrodes 530 and has the same potential as the touch electrode 530 connected thereto. Accordingly, the pixel capacitance of the first pixel electrode 524α and the second pixel electrode 524β sandwiching the first touch wiring line 531α therebetween can be made equal to the pixel capacitance of the second pixel electrode 524β and a third pixel electrode 524γ sandwiching the dummy wiring line 542 therebetween. As a result, the display quality can be improved.

Other Embodiments

The techniques disclosed in the present specification are not limited to the embodiments described above and illustrated in the drawings, and the following embodiments, for example, are also included within the technical scope.

(1) The array interval in the X-axis direction of the plurality of spacers 40, 140, 240, 440, 540 (higher portions 36A, 136A, 236A, 436A, 536A) can be changed as appropriate. For example, two pixel electrodes 24, 424 and one source wiring line 27, 427 (touch wiring line 31, 431, connection wiring line 32, 432) may be interposed between two spacers 40, 140, 240, 440, 540 (higher portions 36A, 136A, 236A, 436A, 536A) adjacent to each other in the X-axis direction. Further, four or more pixel electrodes 24, 424 and three or more source wiring lines 27, 427 (touch wiring lines 31, 431, connection wiring lines 32, 432) may be interposed between two spacers 40, 140, 240, 440, 540 (higher portions 36A, 136A, 236A, 436A, 536A) adjacent to each other in the X-axis direction. Thus, the arrangement of the touch wiring lines 31, 431 and the connection wiring lines 32, 432 can be changed as appropriate by changing the array interval of the spacers 40, 140, 240, 440, 540.

(2) All of the first touch wiring lines 31α, 131α, 231α, 331α, 431α, 531α and the first connection wiring lines 32α, 132α, 232α, 332α, 432α, 532α may be omitted. In this case, the touch wiring lines 31, 431 and the connection wiring lines 32, 432 are disposed only at positions between the third pixel electrodes 24γ, 224γ, 424γ, 524γ and the fourth pixel electrodes 24δ, 224δ, 324δ. In this case, the plurality of spacers 40, 140, 240, 440, 540 may be disposed at positions between the first pixel electrodes 24α, 224α, 324α, 424α, 524α (first pixel electrode row) and the second pixel electrodes 24β, 224β, 424β, 524β (second pixel electrode row 24βC) in addition to positions between the second pixel electrodes 24β, 224β, 424β, 524β (second pixel electrode row 24βC) and the third pixel electrodes 24γ, 224γ, 424γ, 524γ (third pixel electrode row 24γC). Further, in the fifth and sixth embodiments, the plurality of dummy wiring lines 42, 542 may be disposed at positions between the first pixel electrodes 24α, 224α, 324α, 424α, 524α and the second pixel electrodes 24β, 224β, 424β, 524β in addition to positions between the second pixel electrodes 24β, 224β, 424β, 524β and the third pixel electrodes 24γ, 224γ, 424γ, 524γ.

(3) Some of the plurality of first touch wiring lines 31α, 131α, 231α, 331α, 431α, 531α and the plurality of first connection wiring lines 32α, 132α, 232α, 332α, 432α, 532α may be omitted.

(4) All of the second touch wiring lines 31β, 131β, 231β, 331β, 431β and the second connection wiring lines 32β, 132β, 232β, 332β, 432β may be omitted. In this case, the touch wiring lines 31, 431 and the connection wiring lines 32, 432 are disposed only at positions between the first pixel electrodes 24α, 224α, 324α, 424α, 524α and the second pixel electrodes 24β, 224β, 424β, 524β. In this case, the plurality of spacers 40, 140, 240, 440, 540 may be disposed at positions between the third pixel electrodes 24γ, 224γ, 424γ, 524γ (third pixel electrode row 24γC) and the fourth pixel electrodes 24δ, 224δ, 324δ (fourth pixel electrode row) in addition to positions between the second pixel electrodes 24β, 224β, 424β, 524β (second pixel electrode row 24βC) and the third pixel electrodes 24γ, 224γ, 424γ, 524γ (third pixel electrode row 24γC). In the fifth and sixth embodiments, the plurality of dummy wiring lines 42, 542 may be disposed at positions between the third pixel electrodes 24γ, 224γ, 424γ, 524γ and the fourth pixel electrodes 24δ, 224δ, 324δ in addition to positions between the second pixel electrodes 24β, 224β, 424β, 524β and the third pixel electrodes 24γ, 224γ, 424γ, 524γ.

(5) Some of the second touch wiring lines 31β, 131β, 231β, 331β, 431β and the second connection wiring lines 32β, 132β, 232β, 332β, 432β may be omitted.

(6) The plurality of touch wiring lines 31, 431 and the plurality of connection wiring lines 32, 432 may include the touch wiring lines 31, 431 and connection wiring lines 32, 432 disposed at positions between the second pixel electrodes 24β, 224β, 424β, 524β and the third pixel electrodes 24γ, 224γ, 424γ, 524γ. In this case, the spacers 40, 140, 240, 440, 540 and the higher portions 36A, 136A, 236A, 436A, 536A are disposed between certain second pixel electrodes 24β, 224β, 424β, 524β and third pixel electrodes 24γ, 224γ, 424γ, 524γ, whereas the touch wiring lines 31, 431 and the connection wiring lines 32, 432 are disposed between other second pixel electrodes 24β, 224β, 424β, 524β and third pixel electrodes 24γ, 224γ, 424γ, 524γ.

(7) The specific arrangement of the spacers 40, 140, 240, 440, 540 and the higher portions 36A, 136A, 236A, 436A, 536A can be changed as appropriate. For example, the centers of the spacers 40, 140, 240, 440, 540 and the higher portions 36A, 136A, 236A, 436A, 536A may be shifted from the center positions of the source wiring line 27, 427 in the X-axis direction. In this case, the overlapping ranges of the spacers 40, 140, 240, 440, 540 and the higher portions 36A, 136A, 236A, 436A, 536A with respect to the TFT 23 may be widened or narrowed. Further, the spacers 40, 140, 240, 440, 540 may be disposed at positions not overlapping the gate wiring lines 26, 226 or the TFT 23. Further, the spacers 40, 140, 240, 440, 540 and the higher portions 36A, 136A, 236A, 436A, 536A may not be positioned between the second pixel electrodes 24β, 224β, 424β, 524β and the third pixel electrodes 24γ, 224γ, 424γ, 524γ, but may be positioned between the second pixel electrode row 24βC and the third pixel electrode row 24γC. That is, the spacers 40, 140, 240, 440, 540 and the higher portions 36A, 136A, 236A, 436A, 536A may be disposed at intermediate positions between two second pixel electrodes 24β, 224β, 424β, 524β (third pixel electrodes 24γ, 224γ, 424γ, 524γ) adjacent to each other in the Y-axis direction.

(8) The specific installation number, installation ratio, arrangement, and the like of the main spacers 40α, 140α and the sub-spacers 40β, 140β can be changed as appropriate. For example, some of the main spacers 40α, 140α may be positioned between two touch electrodes 30, 130, 230, 330, 430, 530 adjacent to each other in the Y-axis direction.

(9) The main spacers 40α, 140α and the sub-spacers 40β, 140β may have the same planar shape.

(10) The higher portions 36A, 136A, 236A, 436A, 536A overlapping the main spacers 40α, 140α and the higher portions 36A, 136A, 236A, 436A, 536A overlapping the sub-spacers 40β, 140β may have different planar shapes, heights, and the like.

(11) Some or all of the blocking portions 41, 141, 241, 341, 441 may be omitted.

(12) Some or all of the connection wiring lines 32, 432 may be omitted.

(13) The plurality of TFTs 23 may be an array in which the TFTs 23 disposed on one side in the X-axis direction of the source wiring lines 27, 427 to be connected thereto, and the TFTs 23 disposed on the other side in the X-axis direction of the source wiring lines 27, 427 to be connected thereto are alternately disposed in the Y-axis direction. Further, all of the TFTs 23 may be disposed on one side or the other side in the X-axis direction of the source wiring lines 27, 427 to be connected thereto.

(14) The patterns of the gate wiring lines 26, 226 and the source wiring lines 27, 427 in plan view can be changed as appropriate. For example, the gate wiring lines 26, 226 may extend obliquely to be repeatedly bent in the middle without extending linearly. Further, the source wiring lines 27, 427 may extend linearly in the Y-axis direction. Further, the gate wiring lines 26, 226, and the source wiring lines 27, 427 may all extend obliquely to be repeatedly bent in the middle without extending linearly. Further, the gate wiring lines 26, 226, and the source wiring lines 27, 427 all may extend linearly.

(15) The gate circuit portion 13 may be omitted. In this case, a gate driver having the same function as that of the gate circuit portion 13 may be mounted on the array substrates 21, 121, 421, 521. Further, the gate circuit portion 13 can be provided to only a side portion on one side of the array substrate 21, 121, 421, 521.

(16) The material of the semiconductor film constituting the semiconductor portion 23D may be polysilicon (low-temperature polycrystalline silicon (LTPS)) or the like.

(17) The touch panel pattern may be a mutual capacitance type in addition to a self-capacitance type.

(18) The liquid crystal panel 10 need not include a touch panel function. In this case, the common electrode 25 has a non-divided structure, and is disposed in a substantially solid-like form over at least the entire display region AA. On the array substrates 21, 121, 421, 521, a common wiring line composed of the third metal film and connected to the common electrode 25 is provided as the first wiring line. A common potential is supplied to the common electrode 25 by the common wiring line.

(19) The configurations of the TFT 23 may be a top gate type, a double gate type, or the like, in addition to the bottom gate type illustrated in the drawings.

(20) The color filter 28 may be provided on the array substrates 21, 121, 421, 521. In this case, the pixel electrodes 24, 424 and the color filter 28 are both provided on the array substrates 21, 121, 421, 521, and the components of the pixels are not provided on the counter substrates 20, 120, 220.

(21) The number of colors of the color filter 28 may be four or more. The color filter 28 to be added may be a yellow color filter capable of emitting yellow light included in a yellow wavelength region (approximately 570 nm to approximately 600 nm), a white color filter capable of emitting light in a full wavelength region, or the like.

(22) The planar shape of the liquid crystal panel 10 may be rectangular with vertical elongation, square, circular, semi-circular, elliptical, oval, trapezoidal, or the like.

(23) The liquid crystal panel 10 may be a reflective type or a semi-transmissive type, in addition to a transmissive type.

(24) The display panel may be a type different from the liquid crystal panel 10 (such as an organic electroluminescence (EL) display panel) or a microcapsule-type electrophoretic display panel (EPD).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:
   an array substrate;
   a counter substrate facing the array substrate with a gap therebetween;
   a first pixel electrode provided to the array substrate;
   a second pixel electrode provided to the array substrate and spaced apart from the first pixel electrode in a first direction;
   a third pixel electrode provided to the array substrate and spaced apart from the second pixel electrode in the first direction;
   a first wiring line provided to the array substrate, positioned between the first pixel electrode and the second pixel electrode, and extending in a second direction intersecting the first direction;
   a second pixel electrode row provided to the array substrate, including the second pixel electrode, and composed of a plurality of pixel electrodes aligned in the second direction;
   a third pixel electrode row provided to the array substrate, including the third pixel electrode, and composed of a plurality of pixel electrodes aligned in the second direction;
   a first insulating film provided to the array substrate and disposed on a lower-layer side of the first wiring line; and
   a spacer provided to the counter substrate and protruding from the counter substrate toward the array substrate,
   wherein the spacer is positioned between the second pixel electrode row and the third pixel electrode row, and
   a portion of the first insulating film overlapping the spacer is a higher portion higher than a remaining portion,
   wherein the array substrate is provided with
      a second insulating film disposed on an upper-layer side of the first wiring line, and
      a position detection electrode disposed on an upper-layer side of the second insulating film, and
   the first wiring line includes a first position detection wiring line connected to any one of a plurality of the position detection electrodes,
   wherein the array substrate is provided with
      a third wiring line disposed on a lower-layer side of the first insulating film, and
      a blocking portion disposed in the same layer as the first wiring line,
   a plurality of the first pixel electrodes, a plurality of the second pixel electrodes, and a plurality of the third pixel electrodes are disposed side by side spaced apart in the second direction,
   the plurality of the position detection electrodes is disposed side by side spaced apart in the second direction, and a boundary between two of the position detection electrodes adjacent to each other in the second direction is aligned with boundaries between two of the first pixel electrodes, two of the second pixel electrodes, and two of the third pixel electrodes respectively adjacent to each other in the second direction,
   the third wiring line extends in the first direction and is positioned between the two of the position detection electrodes adjacent to each other in the second direction, and
   the blocking portion overlaps at least a portion of the third wiring line and is directly or indirectly connected to any one of the plurality of the position detection electrodes.

2. The display device according to claim 1,
   wherein the spacer includes
      a main spacer, and
      a plurality of sub-spacers each having a protrusion dimension from the counter substrate smaller than a protrusion dimension of the main spacer,
   the main spacer overlaps any one of the plurality of the position detection electrodes, and the plurality of sub-spacers includes
      a first sub-spacer overlapping any one of the plurality of the position detection electrodes, and
      a second sub-spacer at least partially positioned between the two of the position detection electrodes adjacent to each other in the second direction, and overlapping a portion of the blocking portion.

3. The display device according to claim 1,
   wherein the spacer includes
      a main spacer, and
      a sub-spacer having a protrusion dimension from the counter substrate smaller than a protrusion dimension of the main spacer, and
   the main spacer and the sub-spacer each overlaps any one of the plurality of the position detection electrodes and does not overlap the blocking portion.

4. The display device according to claim 1,
   wherein the array substrate is provided with
      a fourth pixel electrode spaced apart from the third pixel electrode on a side opposite the second pixel electrode in the first direction, and
      a second position detection wiring line positioned between the third pixel electrode and the fourth pixel electrode and extending in the second direction,
   the array substrate or the counter substrate is provided with
      a first color filter overlapping the first pixel electrode and the fourth pixel electrode,
      a second color filter overlapping the second pixel electrode, and
      a third color filter overlapping the third pixel electrode,
   the first color filter is highest in relative luminous efficiency,
   the second color filter is lowest in the relative luminous efficiency, and the third color filter is lower in the relative luminous efficiency than the first color filter and higher in the relative luminous efficiency than the second color filter, the blocking portion includes
- a first blocking portion coupled to the first position detection wiring line,
- a second blocking portion coupled to the second position detection wiring line, and
- a third blocking portion separated from the first position detection wiring line, the second position detection wiring line, the first blocking portion, and the second blocking portion, and the third blocking portion is disposed between the first blocking portion and the second blocking portion in the first direction.

5. The display device according to claim 1,
wherein the array substrate is provided with
- a plurality of fourth pixel electrodes spaced apart from the plurality of the third pixel electrodes on a side opposite the second pixel electrode in the first direction, and
- a second position detection wiring line positioned between the third pixel electrode and the fourth pixel electrode and extending in the second direction,
- the array substrate or the counter substrate is provided with a plurality of first color filters overlapping the first pixel electrode and the fourth pixel electrode,
- a plurality of second color filters overlapping the second pixel electrode, and
- a plurality of third color filters overlapping the third pixel electrode, the first color filter is highest in relative luminous efficiency, the second color filter is lowest in the relative luminous efficiency, the third color filter is lower in the relative luminous efficiency than the first color filter and higher in the relative luminous efficiency than the second color filter, the blocking portion includes
- a fourth blocking portion coupled to the first position detection wiring line, and
- a fifth blocking portion coupled to the second position detection wiring line, and the fourth blocking portion and the fifth blocking portion are disposed with the higher portion interposed therebetween.

6. The display device according to claim 5,
wherein the plurality of the position detection electrodes includes
- a first position detection electrode,
- a second position detection electrode spaced apart from the first position detection electrode in the second direction, and
- a third position detection electrode spaced apart from the second position detection electrode in the second direction, the fourth blocking portion and the fifth blocking portion are positioned between the first position detection electrode and the second position detection electrode and between the second position detection electrode and the third position detection electrode, respectively, the blocking portion includes
- a sixth blocking portion coupled to the second position detection wiring line, and
- a seventh blocking portion coupled to the first position detection wiring line, the sixth blocking portion is disposed on a side opposite the fifth blocking portion in the first direction with the second position detection wiring line interposed therebetween, and the seventh blocking portion is disposed on a side opposite the fourth blocking portion in the first direction with the first position detection wiring line interposed therebetween.

* * * * *